United States Patent
Horiguchi et al.

(10) Patent No.: US 6,374,224 B1
(45) Date of Patent: Apr. 16, 2002

(54) METHOD AND APPARATUS FOR STYLE CONTROL IN NATURAL LANGUAGE GENERATION

(75) Inventors: Keiko Horiguchi; Alexander M. Franz, both of Palo Alto, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/266,248

(22) Filed: Mar. 10, 1999

(51) Int. Cl.$^7$ .......................... G06F 17/28; G10L 13/08
(52) U.S. Cl. ........................................ 704/266; 704/277
(58) Field of Search .............................. 704/3, 4, 277, 704/261, 268, 269, 266; 379/88.05, 88.06

(56) References Cited

U.S. PATENT DOCUMENTS

| | | |
|---|---|---|
| 4,592,085 A | 5/1986 | Watari et al. |
| 4,686,332 A | 8/1987 | Greanias et al. |
| 4,882,681 A | 11/1989 | Brotz |
| 4,974,191 A | 11/1990 | Amirghodsi et al. |
| 4,984,177 A | 1/1991 | Rondel et al. |
| 4,984,178 A | 1/1991 | Hemphill et al. |
| 5,003,601 A | 3/1991 | Watari et al. |
| 5,093,899 A | 3/1992 | Hiraiwa |
| 5,095,432 A | 3/1992 | Reed |
| 5,111,398 A | 5/1992 | Nunberg et al. |
| 5,267,345 A | 11/1993 | Brown et al. |
| 5,301,257 A | 4/1994 | Tani |
| 5,335,261 A | 8/1994 | Fujinaka |
| 5,337,232 A | 8/1994 | Sakai et al. |
| 5,353,376 A | 10/1994 | Oh et al. |
| 5,355,432 A | 10/1994 | Tanaka et al. |
| 5,390,280 A | 2/1995 | Kato et al. |
| 5,418,717 A | 5/1995 | Su et al. |

(List continued on next page.)

FOREIGN PATENT DOCUMENTS

| | | |
|---|---|---|
| EP | 0 525 470 A2 | 2/1993 |
| EP | 0 736 857 A2 | 10/1996 |
| EP | 0 774 729 A2 | 11/1996 |
| EP | 0 751 467 A2 | 1/1997 |
| EP | 0805403 A2 | 5/1997 |
| EP | 0 862 161 A2 | 2/1998 |
| EP | 0 892 353 A2 | 7/1998 |
| EP | 0 913 809 A2 | 8/1998 |

OTHER PUBLICATIONS

Cranias, et al., "Clustering: A Technique for Search Space Reduction in Example–Based Machine Translation", Proceedings of the International Conference on Systems, Man, and Cybernetics, 1994, pp. 1–6.

(List continued on next page.)

Primary Examiner—William Korzuch
Assistant Examiner—Martin Lerner
(74) Attorney, Agent, or Firm—Blakely, Sokoloff, Taylor & Zafman LLP

(57) ABSTRACT

A method and an apparatus for style control in natural language recognition and generation are provided, wherein an acoustic input is received comprising at least one source language. The acoustic input comprises words, sentences, and phrases in a natural spoken language. Source expressions are recognized in the source language. Style parameters are determined for the source expression. The style parameters may be extracted from the source expression, set by the user, or randomly selected by the natural language system. A recognized source expression is selected and confirmed by a user through a user interface. The recognized source expressions are translated from the source language to a target language. An acoustic output is generated from the translated target language source expressions using the style parameters. The style parameters comprise variations selected from a group comprising formality, local dialect, gender, and age variations.

21 Claims, 13 Drawing Sheets

U.S. PATENT DOCUMENTS

| | | |
|---|---|---|
| 5,426,583 A | 6/1995 | Uribe-Echebarria Diaz De Mendibil |
| 5,444,617 A | 8/1995 | Merialdo |
| 5,469,512 A | 11/1995 | Fujita et al. |
| 5,500,920 A | 3/1996 | Kupiec |
| 5,503,560 A | 4/1996 | Stentiford |
| 5,510,981 A | 4/1996 | Berger et al. |
| 5,546,500 A | 8/1996 | Lyberg |
| 5,546,538 A | 8/1996 | Cobbley et al. |
| 5,560,037 A | 9/1996 | Kaplan |
| 5,561,722 A | 10/1996 | Watari et al. |
| 5,566,271 A | 10/1996 | Tomitsuka et al. |
| 5,583,965 A | 12/1996 | Douma et al. |
| 5,659,765 A | 8/1997 | Nii |
| 5,677,835 A | 10/1997 | Carbonell et al. |
| 5,748,841 A | 5/1998 | Morin et al. |
| 5,768,603 A | 6/1998 | Brown et al. |
| 5,822,593 A | 10/1998 | Lamping et al. |
| 5,845,245 A | 12/1998 | Gupta et al. ................ 704/231 |
| 5,848,389 A * | 12/1998 | Asano et al. ............... 704/239 |
| 5,864,788 A | 1/1999 | Kutsumi |
| 5,884,083 A | 3/1999 | Royce et al. |
| 5,884,246 A | 3/1999 | Boucher et al. |
| 5,884,247 A | 3/1999 | Christy |
| 5,907,821 A | 5/1999 | Kaji et al. |
| 5,956,668 A | 9/1999 | Alshawi et al. |
| 5,960,384 A | 9/1999 | Brash |
| 5,963,892 A | 10/1999 | Tanaka et al. |
| 5,983,179 A | 11/1999 | Gould |
| 5,991,721 A * | 11/1999 | Asano et al. ............... 704/257 |
| 5,995,920 A | 11/1999 | Carbonell et al. |
| 5,995,935 A * | 11/1999 | Hagiwara et al. ........... 704/272 |
| 6,085,162 A | 7/2000 | Cherny |
| 6,092,038 A | 7/2000 | Kanevsky et al. |
| 6,161,083 A | 12/2000 | Franz et al. |

OTHER PUBLICATIONS

Higuchi, et al., "The IXM2 Parallel Associative Processor for AI Computer", vol. 27, No. 11, Nov. 1994.

International Search Report, PCT/US99/28879, May 2, 2000, 2 pp.

Hitashi Iida, et al., "Spoken–Language Translation Method Using Examples", ATR Interpreting Telecommunications Research Laboratories, Proc. Of COLING–96, Copenhagen, Denmark, Aug. 1996, 4 pgs.

Hideo Watanabe, "A Simularity–Driven Transfer System", Proc. of COLING–92, Nantes, Aug. 23–28, 1992, pp. 770–776.

Koichi Takeda, "Pattern–Based Machine Translation", Tokyo Research Laboratory, IBM Research, 4 pgs.

W. John Hutchins, et al., "An Introduction to Machine Translation", Academic Press, London, 1992, pp. 21–52.

Sobashima, et al., "A Bidirectional, Transfer Driven Machine Translation System for Spoken Dialogues", ATR Interpreting Telecommunications Research Laboratories, Proc. Od COLING 94, Kyoto, Japan, 1994, pp. 64–68.

Watanabe, et al., "Transfer System Using Example–Based Approach", IEICE Trans. Inf. & Syst., vol. E77–D, No. 2, Feb. 1994, pp. 247–257.

Document No. 08–111442, May 2, 1996 and Document No. 09–046140, Feb. 28, 1997, 1 page combined.

Masaru Tomita, et al., "The Generalized LR Parser/Compiler, Version 8.1: User's Guide", CMU–CMT–88–MEMO Apr. 20, 1988, 48 pgs.

Ishii, et al., "An Efficient Parser Generator for natural Language", Proc. Of CLOING–94, Kyoto, Japan, 1194, pp. 417–421.

Batliner, et al., "M=Syntax+Prosodic Labelling Scheme for Large Spontaneous Speech Databases", pp. 193–222.

Bateman, et al., "Selective Information Presentation in an Integrated Publication System: An Application of Genre–Driven Text Generation", pp. 753–767.

Duff, et al., "An Architecture For Spoken Dialogue Management", pp. 1025–1028.

Franz, et al., "Grades of Specificity in Example–Based Speech Translation", Spoken Language Technology, Sony US Research Laboratories, 2 pgs.

Maruyama, et al., "Tree Cover Search Algorithm for Example–Based Translation", TMI–92, pp. 173–184.

Oerder, et al., "Word Graphs: An Efficient interface Between Continuous Speech Recognition and Language Understanding", 0–7803–0946–4/93, 1993 IEEE, p. II–119–II–122.

Bahl, et al., "A Maximum Likelihood Approach to Continuous Speech Recognition", 0162–8828/83/0300–0179, p. 308–319.

Tomita, See–Kiong Ng, "Generalized LR Parsing", M. Tomita (ed.), Klawen Academic Publishers, 1991, pp. 1–16.

Kimmo Koskenniemi, "Two–Level Morphology: A General Computational Model for Word–Form Recognition and Production", ISBN 951–45–3201–5, ISSN 0355–7170, 1983, pp. 1–160.

Gazdar, et al., "Finite State Morphology, A Review of Koskenniemi (1983)", Center for the Study of Language and Info., Report No. CSLI–85–32, Sep. 1985, 10 pgs.

International Search Report PCT/US99/27667, 7 pgs., Nov. 22, 1999.

International Search Report PCT/US99/29093, Dec. 7, 1999, 7 pgs.

International Search Report PCT/US99/28958, Dec. 7, 1999, 6 pgs.

International Search Report PCT/US99/27874, Nov. 24, 1999, 6 pgs.

PCT Written Opinion PCT/US99/28958, 7 pgs., Sep. 28, 2000.

Murray, I.R, et al., "Synthesizing Emotions in Speech: Is It Time To Get Excited?," The MicroCentre, Applied Computer Studies Division, University of Dundee, Dundee DDI 4HN, U.K.

Shirai, S., et al., "A Hybrid Rule and Example–based Method for Machine Translation," NTT Comminication Schience Laboratories, pp. 1–5.

Amasoft, Amasoft Technology Inc., Company Profile, Prolegomenon.

* cited by examiner

METHOD AND APPARATUS FOR STYLE CONTROL IN NATURAL LANGUAGE GENERATION

FIELD OF THE INVENTION

This invention relates to speech or voice translation systems. More particularly, this invention relates to style control in the natural language generation of a spoken language translation system.

BACKGROUND

Speech is the predominant mode of human communication because it is very efficient and convenient. Certainly, written language is very important, and much of the knowledge that is passed from generation to generation is in written form, but speech is a preferred mode for everyday interaction. Consequently, spoken language is typically the most natural, most efficient, and most expressive means of communicating information, intentions, and wishes. Speakers of different languages, however, face a formidable problem in that they cannot effectively communicate in the face of their language barrier. This poses a real problem in today's world because of the ease and frequency of travel between countries. Furthermore, the global economy brings together business people of all nationalities in the execution of multinational business dealings, a forum requiring efficient and accurate communication. As a result, a need has developed for a machine-aided interpersonal communication system that accepts natural fluent speech input in one language and provides an accurate near real-time output comprising natural fluent speech in another language. This system would relieve users of the need to possess specialized linguistic or translational knowledge. Furthermore, there is a need for the machine-aided interpersonal communication system to be portable so that the user can easily transport it.

A typical language translation system functions by using natural language processing. Natural language processing is generally concerned with the attempt to recognize a large pattern or sentence by decomposing it into small subpatterns according to linguistic rules. Until recently, however, natural language processing systems have not been accurate or fast enough to support useful applications in the field of language translation, particularly in the field of spoken language translation.

While the same basic techniques for parsing, semantic interpretation, and contextual interpretation may be used for spoken or written language, there are some significant differences that affect system design. For instance, with spoken input the system has to deal with uncertainty. In written language the system knows exactly what words are to be processed. With spoken language it only has a guess at what was said. In addition, spoken language is structurally quite different than written language. In fact, sometimes a transcript of perfectly understandable speech is not comprehensible when read. Spoken language occurs a phrase at a time, and contains considerable intonational information that is not captured in written form. It also contains many repairs, in which the speaker corrects or rephrases something that was just said. In addition, spoken dialogue has a rich interaction of acknowledgment and confirmation that maintains the conversation, which does not appear in written forms.

The basic architecture of a typical spoken language translation or natural language processing system processes sounds produced by a speaker by converting them into digital form using an analog-to-digital converter. This signal is then processed to extract various features, such as the intensity of sound at different frequencies and the change in intensity over time. These features serve as the input to a speech recognition system, which generally uses Hidden Markov Model (HMM) techniques to identify the most likely sequence of words that could have produced the speech signal. The speech recognizer then outputs the most likely sequence of words to serve as input to a natural language processing system. When the natural language processing system needs to generate an utterance, it passes a sentence to a module that translates the words into phonemic sequence and determines an intonational contour, and then passes this information on to a speech synthesis system, which produces the spoken output.

A natural language processing system uses considerable knowledge about the structure of the language, including what the words are, how words combine to form sentences, what the words mean, and how word meanings contribute to sentence meanings. However, linguistic behavior cannot be completely accounted for without also taking into account another aspect of what makes humans intelligent—their general world knowledge and their reasoning abilities.

For example, to answer questions or to participate in a conversation, a person not only must have knowledge about the structure of the language being used, but also must know about the world in general and the conversational setting in particular.

The different forms of knowledge relevant for natural language processing comprise phonetic and phonological knowledge, morphological knowledge, syntactic knowledge, semantic knowledge, and pragmatic knowledge. Phonetic and phonological knowledge concerns how words are related to the sounds that realize them. Morphological knowledge concerns how words are constructed from more basic units called morphemes. Syntactic knowledge concerns how words can be put together to form correct sentences and determines what structural role each word plays in the sentence and what phrases are subparts of what other phrases. Semantic knowledge concerns what words mean and how these meanings combine in sentences to form sentence meanings. This is the study of context-independent meaning—the meaning a sentence has regardless of the context in which it is used. Pragmatic knowledge concerns how sentences are used in different situations and how use affects the interpretation of the sentence.

The typical natural language processor, however, has realized only limited success because these processors operate only within a narrow framework. A natural language processor receives an input sentence, lexically separates the words in the sentence, syntactically determines the types of words, semantically understands the words, pragmatically determines the type of response to generate, and generates the response. The natural language processor employs many types of knowledge and stores different types of knowledge in different knowledge structures that separate the knowledge into organized types. A typical natural language processor also uses very complex capabilities. The knowledge and capabilities of the typical natural language processor must be reduced in complexity and refined to make the natural language processor manageable and useful because a natural language processor must have more than a reasonably correct response to an input sentence.

Identified problems with previous approaches to natural language processing are numerous and involve many components of the typical speech translation system. Regarding the spoken language translation system, stylistic variations are an important part of the message that people convey to each other in verbal communication. It is thus crucial for the spoken language translation system to be able to recognize the mode of the input and to be able to transfer into the appropriate style or mode in the target language in order to achieve a high-quality translation as a communication aid. Since the way in which stylistic variations are encoded varies significantly from one language to another, it is very important to have a systematic way to encode such characteristics in order to generate high-quality output.

On the other hand, the main attraction of natural language interface or dialogue systems derives from the natural and flexible way for people to interact with machines. As the system becomes more powerful and sophisticated, the user naturally expects to see more character and style from the "agent" with which they are talking. The typical natural language interface or dialogue systems use "canned" expressions with some ability of substituting noun phrases for their output. For those systems that use rule-based generation components, the focus has typically been to generate grammatically correct structure with all the necessary information. Consequently, little attention has been paid to generating stylistically different natural language expressions.

SUMMARY OF THE INVENTION

A method and an apparatus for style control in natural language recognition and generation are provided. An acoustic input is received comprising at least one source language. The acoustic input comprises words, sentences, and phrases in a natural spoken language. Source expressions are recognized in the source language. Style parameters are determined for the source expression. The style parameters may be extracted from the source expression, set by the user, or randomly selected by the natural language system. A recognized source expression is selected and confirmed by a user through a user interface. The recognized source expressions are translated from the source language to a target language. An acoustic output is generated from the translated target language source expressions using the style parameters. The style parameters comprise variations selected from a group comprising formality, local dialect, gender, and age variations.

These and other features, aspects, and advantages of the present invention will be apparent from the accompanying drawings and from the detailed description and appended claims which follow.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and an apparatus for a spoken language translation system are provided. In the following description for purposes of explanation, numerous specific details are set forth in order to provide a thorough understanding of the present invention. It will be evident, however, to one skilled in the art that the present invention may be practiced without these specific details. In other instances, well known structures and devices are shown in block diagram form in order to avoid unnecessarily obscuring the present invention. It is noted that experiments with the method and apparatus provided herein show significant speech translation improvements when compared to typical speech translation systems.

Spoken language is typically the most natural, most efficient, and most expressive means of communicating information, intentions, and wishes. At the same time, speakers of different languages face a formidable language barrier. The STS of an embodiment of the present invention provides a system for machine-aided interpersonal communication comprising a number of key features: input by natural, fluent speech (without utterances that are overly long or complicated); no need for the user to possess specialized linguistic or translation knowledge; and, no need for the user to carry out tedious or difficult operations.

Figure 1:
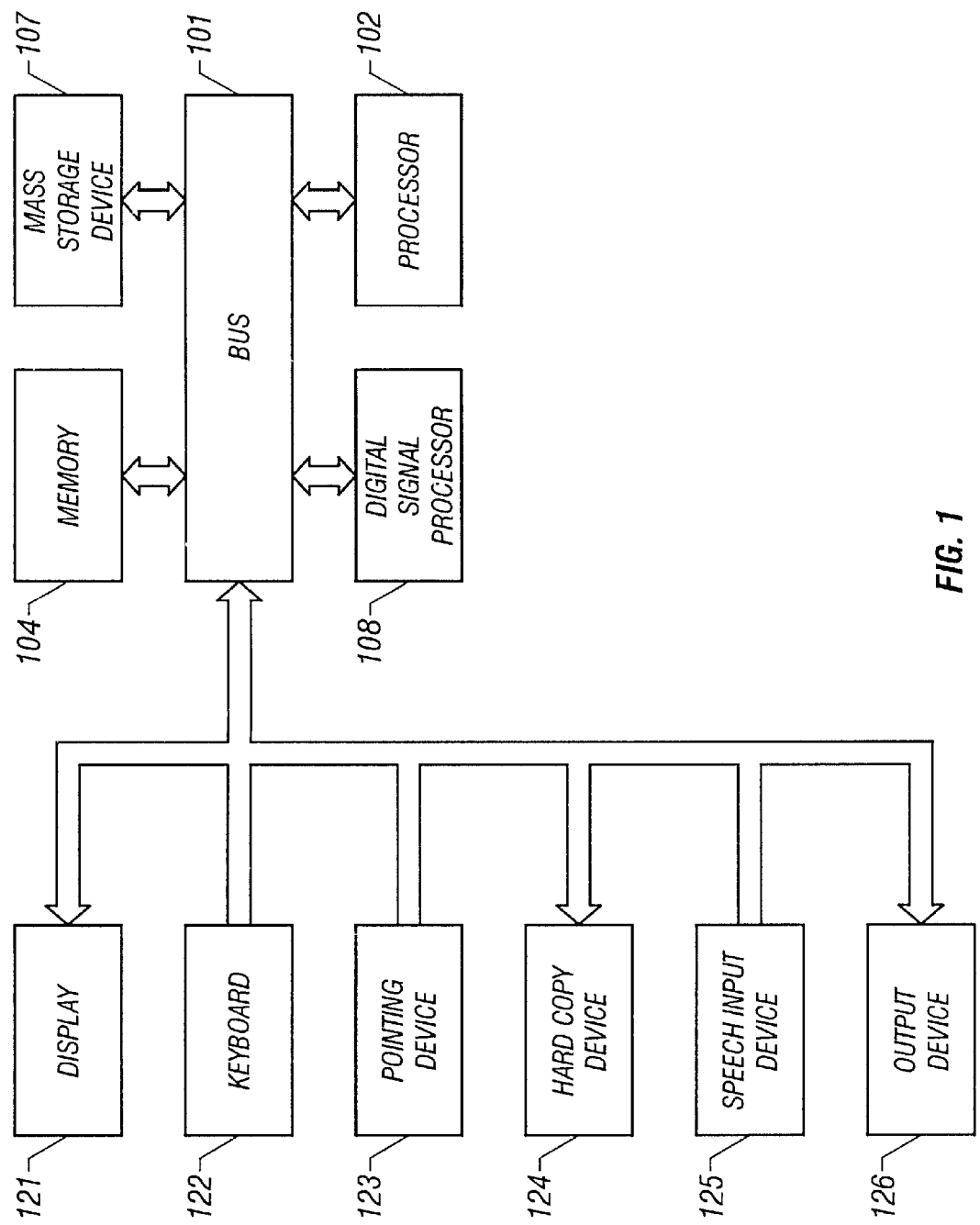
FIG. 1 is a computer system hosting the speech translation system (STS) of an embodiment of the present invention.

FIG. 1 is a computer system 100 hosting the speech translation system (STS) of an embodiment of the present invention. The computer system 100 comprises, but is not limited to, a system bus 101 that allows for communication among at least one processor 102, at least one digital signal processor 108, at least one memory 104, and at least one mass storage device 107. The system bus 101 is also coupled to receive inputs from a keyboard 122, a pointing device 123, and a speech signal input device 125, but is not so limited. The system bus 101 provides outputs to a display device 121, a hard copy device 124, and an output device 126, but is not so limited. The output device 126 may comprise an audio speaker, but is not so limited.

Figure 2:
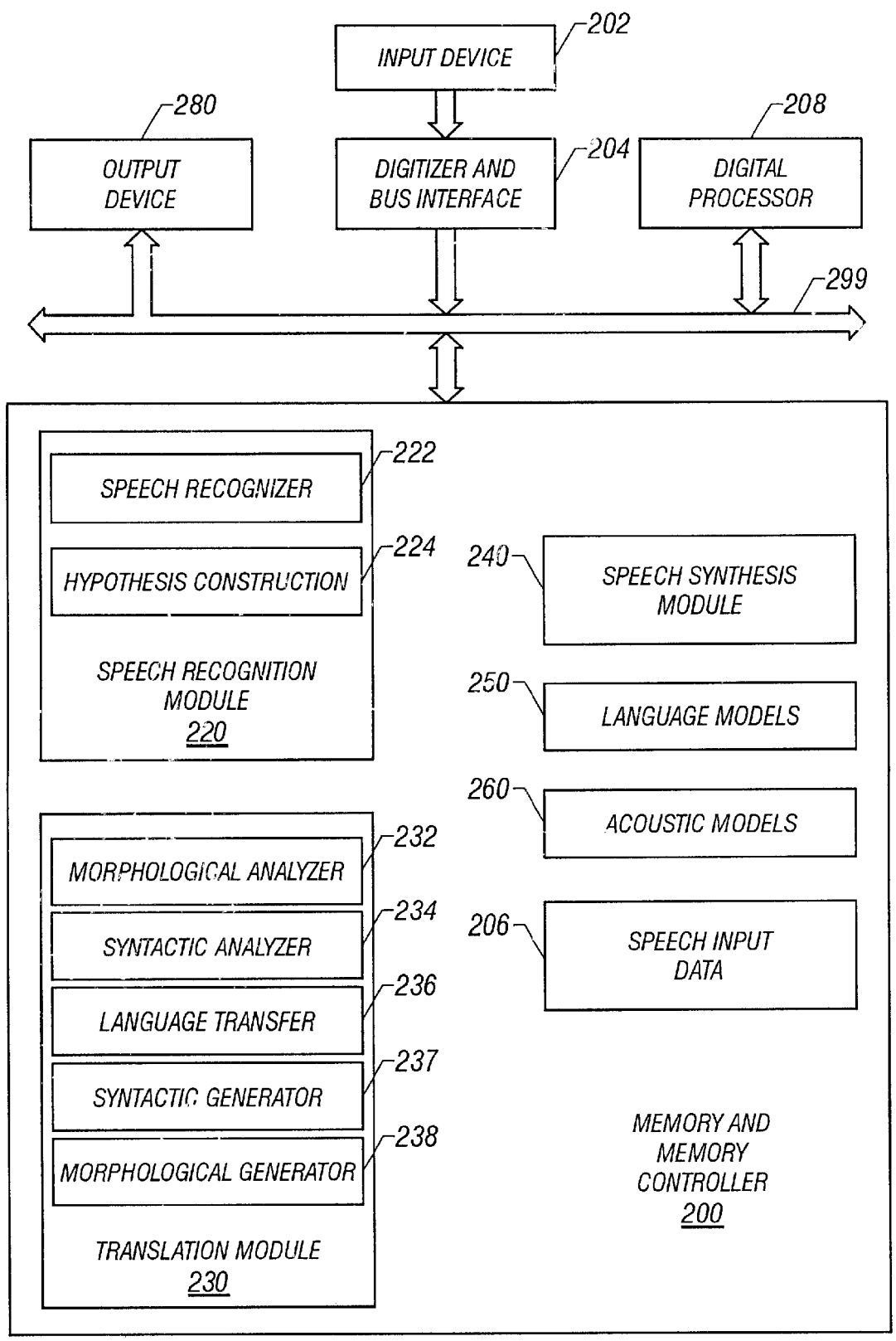
FIG. 2 is a computer system memory hosting the speech translation system of an embodiment of the present invention.

FIG. 2 is a computer system memory 200 hosting the speech translation system of an embodiment of the present invention. An input device 202 provides speech signals to a digitizer and bus interface 204. The digitizer or feature extractor 204 samples and digitizes the speech signals for further processing. The digitizer and bus interface 204 allows for storage of the digitized speech signals in at least one speech input data memory component 206 of memory 200 via the system bus 299, but is not so limited. The digitized speech signals are processed by at least one processor 208 using algorithms and data stored in the components 220–260 of the memory 200. As discussed herein, the algorithms and data that are used in processing the speech signals are stored in components of the memory 220–260 comprising, but not limited to, at least one speech recognition module 220, at least one translation module 230, at least one speech synthesis module 240, at least one language model 250, and at least one acoustic model 260. The speech recognition module 220 of an embodiment of the present invention comprises a speech recognizer 222 and a hypothesis construction module 224, but is not so limited. The translation module 230 of an embodiment of the present invention comprises, but is not limited to, a morphological analyzer 232, a syntactic analyzer 234, a language transfer module 236, a syntactic generator 237, and a morphological generator 238. An output device 280 provides translated output in response to the received speech signals.

The STS of an embodiment may be hosted on a processor, but is not so limited. For an alternate embodiment, the STS may comprise some combination of hardware and software components that are hosted on different processors. For another alternate embodiment, a number of model devices, each comprising a different acoustic model or a language model, may be hosted on a number of different processors. Another alternate embodiment has multiple processors hosting the speech recognition module, the translation module, and the models. For still another embodiment, a number of different model devices may be hosted on a single processor.

The present invention may be embodied in a portable unit that is easily carried by a user. One such embodiment is a laptop computer that includes the elements of FIG. 1 and the elements of FIG. 2. The modules shown in the memory of FIG. 2 may be stored in random access memory (RAM) of the laptop, or may be variously stored in RAM and read only memory (ROM). The ROM may be a removable card. In some laptop embodiments, a conventional processor may be used to perform calculations according to the methods described herein. In other laptop embodiments, a digital signal processor (DSP) may be used to perform some or all of the calculations.

Another portable embodiment is a small unit with specialized functionality, such as a personal data assistant (PDA). For example, one PDA embodiment may perform voice translation functions, voice memo functions, voice e-mail functions, and voice calendar functions, but is not so limited. Another embodiment smaller in size than a laptop computer is a telephone. For example, a cellular telephone may also provide speech translation functions. The size of an embodiment of the present invention is only limited by current hardware size. A pen embodiment and a wristwatch embodiments are envisioned.

For any embodiment, the modules shown in FIG. 2 and any necessary processor may exist on a device such as a laptop computer, or reside elsewhere and be accessed remotely from the unit using known methods and hardware, for example using systems comprising Frequency Modulation (FM) systems, microwave systems, cellular telephone systems, and light modulation systems. For example, elements of the present invention may reside on one or more remote servers that are accessed using a telephone call or a video conference call. In such an embodiment, a user may dial a translation service, which performs translation remotely according to the present invention. Some embodiments, such as cellular telephone and PDA embodiments, allow users to remotely update vocabularies using various communication methods in order to add new words or names or expressions and their translations. In some embodiments, translation may be performed remotely at an internet server and transmitted using internet telephony.

Figure 3:
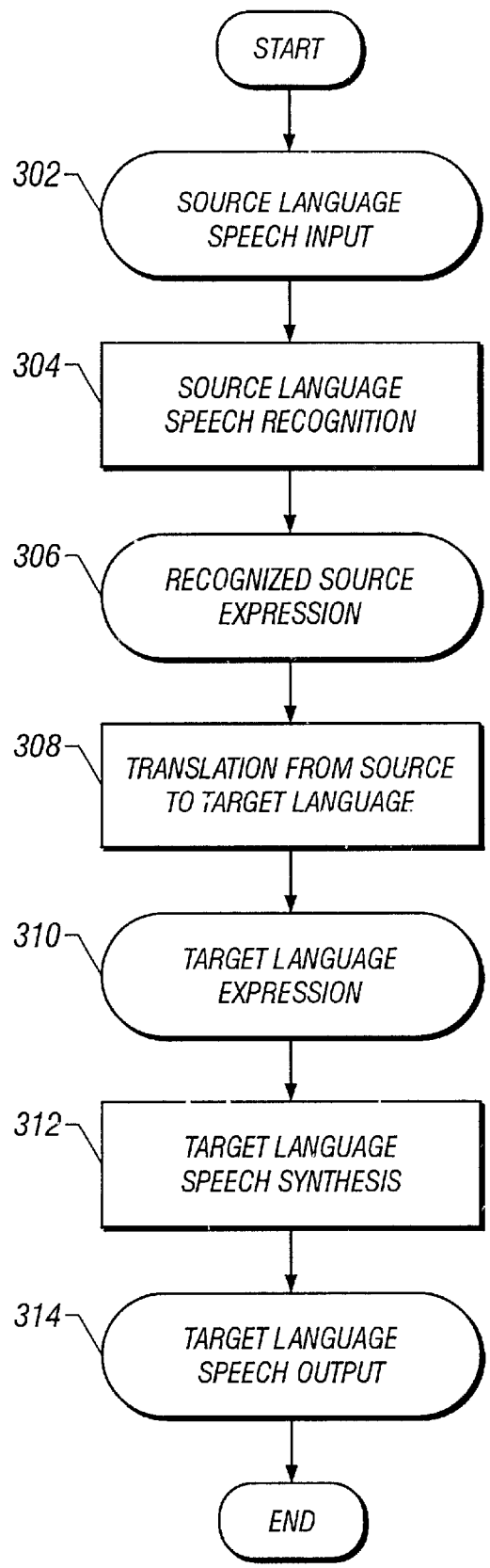
FIG. 3 is a system diagram of the speech translation system of an embodiment of the present invention.

FIG. 3 is a system diagram of the speech translation system of an embodiment of the present invention. The STS of an embodiment is a system that performs speech-to-speech translation for use in facilitating communication between individuals that do not speak the same language, but is not so limited. The STS accepts spoken language in an input or source language. The STS performs speech recognition in the source language while optionally allowing the user to confirm the recognized expression, or allowing the user to choose from a sequence of candidate recognitions. The STS translates the recognized expression from the source language to a target language. In the target language, the STS performs automatic speech synthesis.

In performing spoken language translation, operation begins when a source language speech input 302 is received. Source language speech recognition is performed, at step 304, and a recognized source expression 306 is produced. The recognized source expression 306 is translated from the source language to the target language, at step 308. A target language expression 310 is produced, and the target language expression is used to perform target language speech synthesis, at step 312. The target language speech synthesis produces a target language speech output 314 that represents the source language speech input 302.

Figure 4:
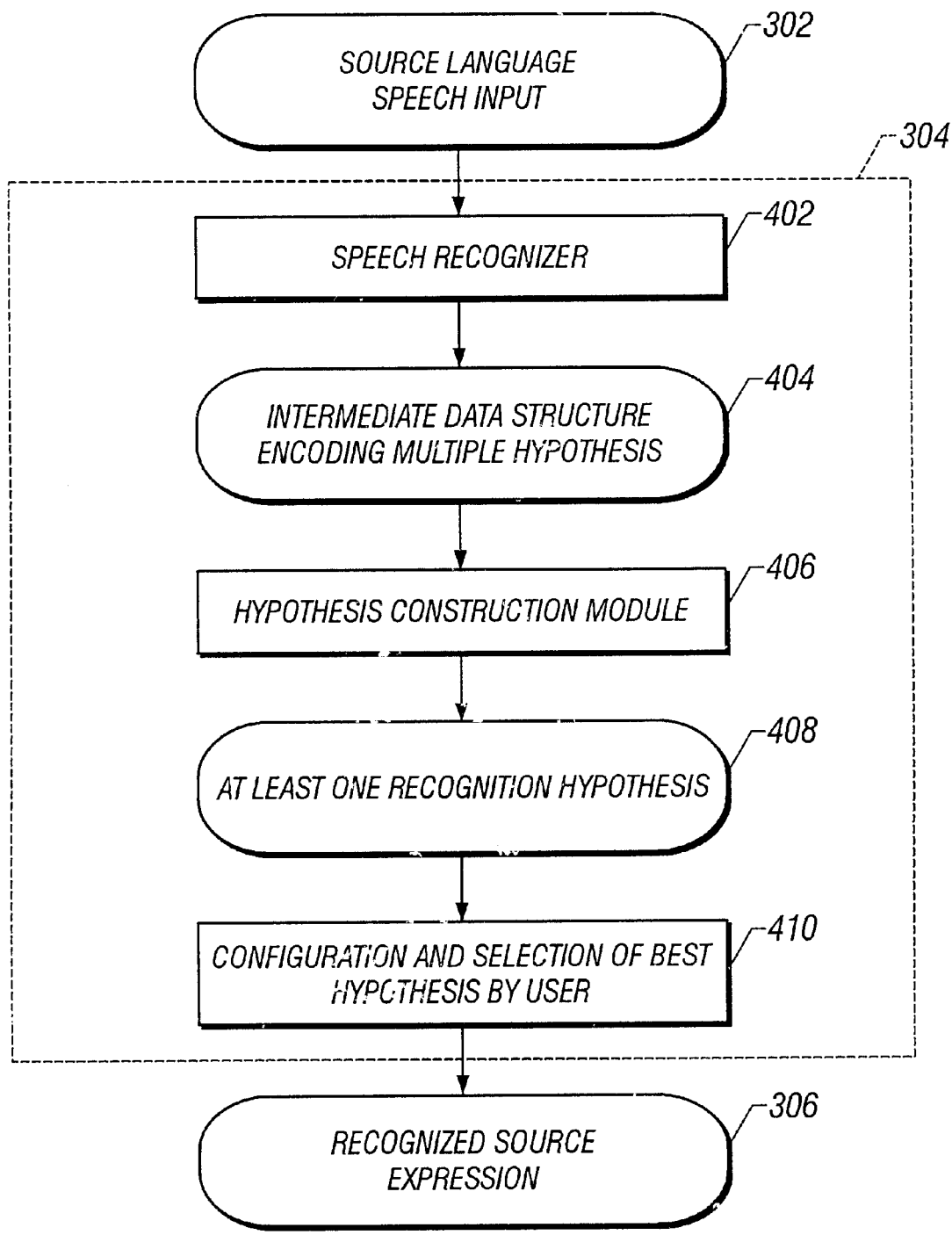
FIG. 4 is a flowchart of source language speech recognition of a speech translation system of an embodiment of the present invention.

FIG. 4 is a system diagram of source language speech recognition 304 of a speech translation system of an embodiment of the present invention. Operation begins when a source language speech input 302 is received. A speech recognizer 402 operates on the source language speech input 302 to produce an intermediate data structure in coding multiple hypotheses 404. A hypothesis construction module 406 produces at least one speech recognition hypothesis 408 from the coded multiple hypotheses 404. Configuration and selection of the best hypothesis is performed, at step 410. An output is provided comprising at least one recognized source expression 306, but the embodiment is not so limited.

Figure 5:
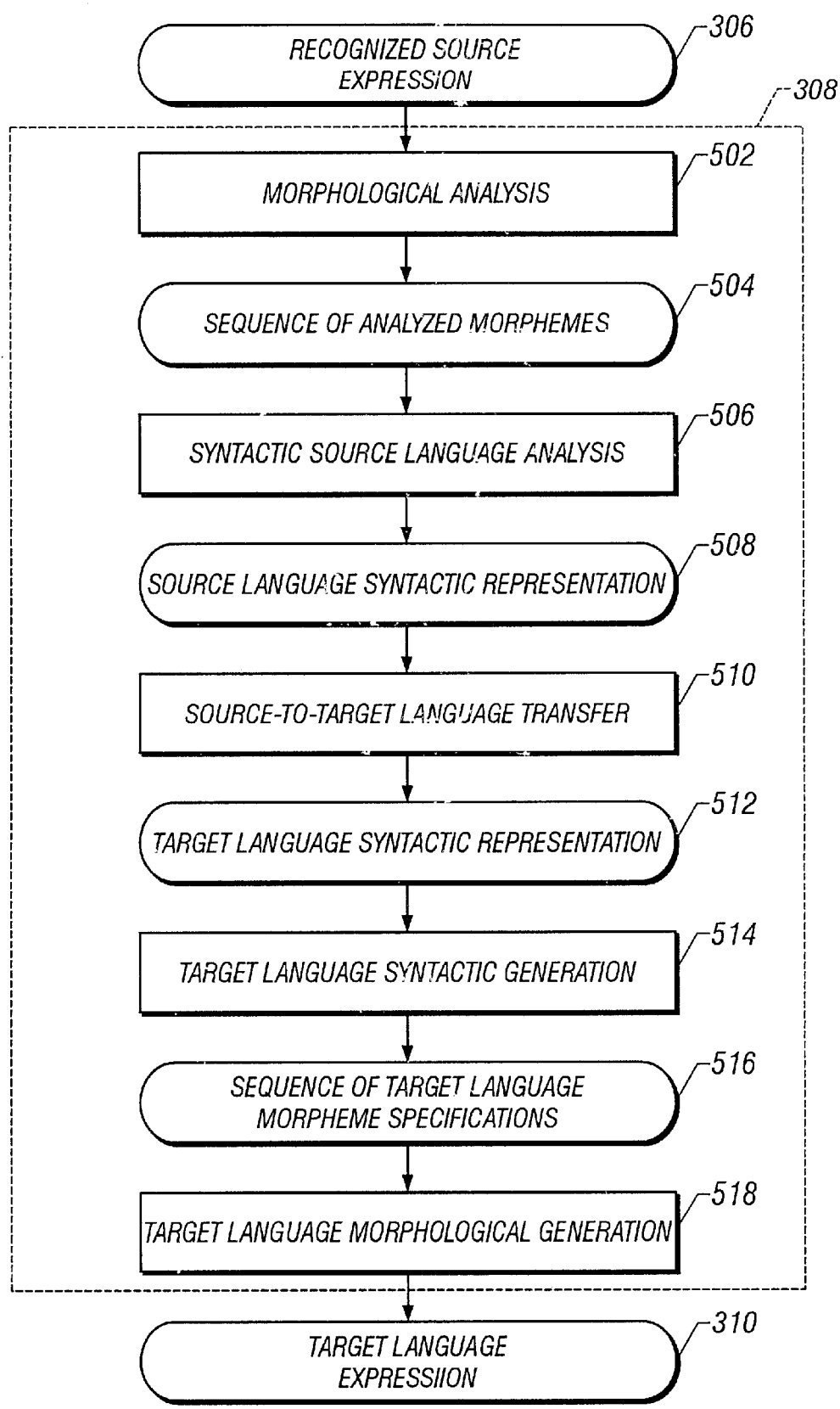
FIG. 5 is a flowchart of translation from a source language to a target language in a speech translation system of an embodiment of the present invention.

FIG. 5 is a system diagram of translation from a source language to a target language 308 in a speech translation system of an embodiment of the present invention. Operation begins upon receipt of a recognized source expression 306. A morphological analysis is performed, at step 502, producing a sequence of analyzed morphemes 504. A syntactic source language analysis is performed, at step 506, on the sequence of analyzed morphemes 504. The syntactic source language analysis produces a source language syntactic representation 508. A source-to-target language transfer is performed, at step 510, resulting in the production of a target language syntactic representation 512. The target language syntactic representation 512 is used to perform target language syntactic generation, at step 514. A sequence of target language morpheme specifications 516 are produced, and are used in target language morphological generation, at step 518. An output is provided comprising at least one target language expression 310, but the embodiment is not so limited.

The STS of an embodiment is able to handle entire sentences in addition to individual words and short phrases.

Therefore, each input expression may be quite long resulting in a greater chance of error by a typical speech recognizer. Consequently, unlike the typical speech translator, the STS of an embodiment of the present invention does not translate word-for-word by looking up the input in a dictionary. Instead, the STS of an embodiment analyzes the input, detects or determines the meaning of the input (e.g. question, statement, etc.), and renders that meaning in the appropriate way in a target language.

The STS of an embodiment uses a large vocabulary in order to handle multiple expressions or sentences that can be constructed using the words of the vocabulary. Consequently, unlike a translation system that uses a complete table of input and output words to formulate the translation, the STS of an embodiment of the present invention creates the translation dynamically. Furthermore, the STS processes natural spoken language, meaning that the STS handles ungrammatical speech as often produced by individuals. The STS of an embodiment comprises a user configuration and recognition hypothesis component to aid in handling misrecognitions due to noise and speaker variation. Therefore, the STS of an embodiment has very high translation accuracy, accuracy that greatly improves the usefulness as a communication aid.

The STS of an embodiment of the present invention performs speech translation by integrating two types of processing. The first type, grammar rule based processing, uses rule driven components that perform certain linguistic analysis and generation processes. The second type of processing, analogical processing or example-based processing, does not use a sequence of rules but instead uses a data driven approach. The rule based components perform syntactic and morphological analysis in the source language, and syntactic and morphological generation in the target language. The example-based component performs the transfer from the source language to the target language. The example based component uses an example database comprising a large number of stored pairs of corresponding expressions in the source and target language. As such, morphological analysis comprises the use of a source language dictionary and source language morphological rules. Furthermore, syntactic source language analysis comprises the use of source language computational analysis grammar rules . Moreover, the source to target language transfer comprises the use of at least one example database and a thesaurus describing similarity between words. Target language syntactic generation comprises the use of target language syntactic generation rules. Additionally, target language morphological generation comprises the use of a target language dictionary and target language morphological generation rules.

Spoken language translation requires a flexible and robust mechanism, such as translation by analogy. At the same time, translation becomes more efficient and accurate when structural regularities are exploited. A new method of shallow syntactic analysis used in the present invention is powerful enough to handle a wide variety of grammatical patterns, yet robust enough to process spoken language. The resulting general syntactic analysis module can be combined with an analogical or statistical transfer module to produce high-quality translation in different domains.

Spoken language is characterized by a number of properties that defy analysis by traditional rule-based methods. Although spoken utterances typically consist of shorter, less complex syntactic structures, they often contain fragments and extra items, such as interjections and filled pauses. Ellipses and irregular word order (inversion and left or right dislocation) are also frequently observed. For these reasons, research has turned from the traditional rule-based framework towards more flexible approaches, such as example-based translation. The method and apparatus of an embodiment of the present invention increase the linguistic efficiency and accuracy of example-based translation by exploiting as many linguistic regularities as possible, without attempting analysis that is too deep or too differentiated to be performed efficiently and accurately on spoken language.

A typical translation system requires example data for every possible input in order to achieve high quality translation. In order to achieve good translational coverage with high quality translation without exhaustively listing every possible input in the example database, an embodiment of the present invention captures syntactic regularities. Capturing syntactic regularities supports example-based translation in an embodiment of the present invention in four ways, but the embodiment is not so limited.

The method for providing syntactic analysis and data structure for translation knowledge in an embodiment of the present invention comprises performing syntactic analysis on the input using at least one parse tree comprising a number of nodes. Each node comprises at least one production rule. Furthermore, at least one node comprises at least one level of nested production rules. Syntactic analysis is performed on at least one entry from the example database using the parse tree. At least one linguistic constituent of the input is determined, and a pragmatic type and a syntactic type of the linguistic constituent are determined. Outputs are provided comprising an identification of the input.

Conceptually, the structural analysis component of an embodiment comprises two steps, but is not so limited. The first step comprises parsing with a context-free grammar, while the second step comprises producing feature structures for the input sentence. This is accomplished with the aid of annotations to the context-free grammar rules.

The information in the feature structures of an embodiment of the present invention originates at the lexical level in the morphological analysis component. The feature structure manipulation annotations on the context-free grammar rules pass this information on to higher-level constituents, apply tests to it, and re-arrange it depending on the syntactic structure of the expression. During this process, structural aspects of the context-free parse tree relating to information comprising sentence types, pragmatic function, honorifics, and modals are reduced to simple feature-value pairs.

The syntactic analysis of an embodiment of the present invention is based on lexical-functional grammar, with five important differences, but is not so limited: grammatical functions of constituents are not recovered; feature structures are not re-entrant; arc names need not be unique; arc order is significant; and feature structures are manipulated using more efficient graph matching and copying operations instead of graph unification.

Figure 6:
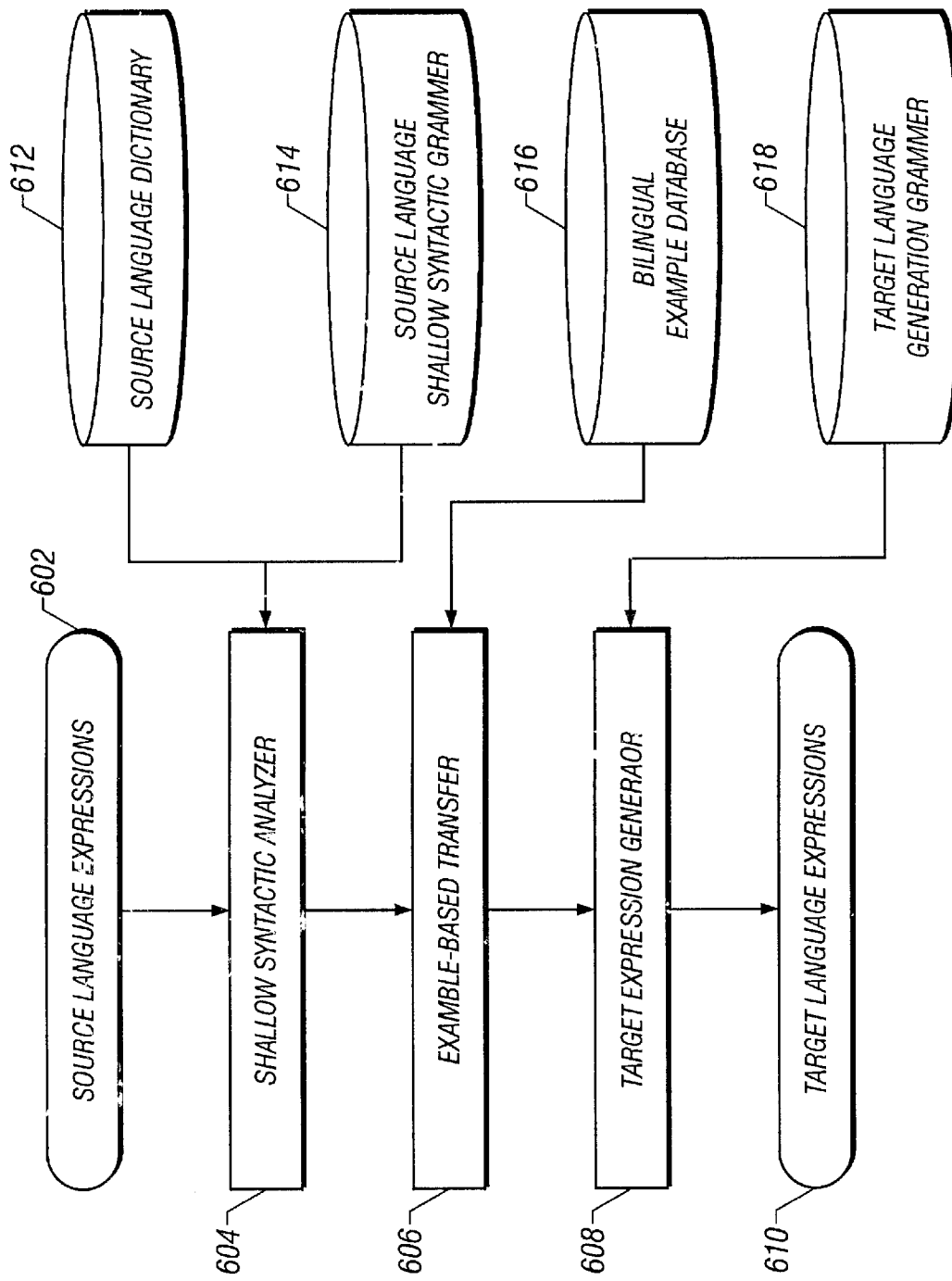
FIG. 6 shows an example-based translation system architecture using syntactic analysis of an embodiment of the present invention.

FIG. 6 shows an example-based translation system architecture using syntactic analysis of an embodiment of the present invention. The translation system architecture of an embodiment comprises a shallow syntactic analyzer 604, an example based transfer 606, and a target expression generator 608, but is not so limited. The shallow syntactic analyzer 604 accesses and uses at least one source language dictionary 612 and at least one source language shallow syntactic grammar 614, but is not so limited. The example based transfer 606 accesses and uses at least one bilingual example database 616, but is not so limited. The target expression generator 608 accesses and uses target language generation grammar 618, but is not so limited. The shallow syntactic analyzer 604 receives a source language expression 602 and the target expression generator 608 outputs a target language expression 610, but is not so limited.

The syntactic analysis of an embodiment of the present invention comprises a shallow analysis to recognize linguistic constituents such as noun phrases, verb phrases and prepositional phrases. In performing the shallow analysis, the information regarding the order of the constituents is retained as the constituents appear in the input. Furthermore, surface variations are reduced into features. Furthermore, the syntactic analysis of an embodiment of the present invention does not try to resolve syntactic ambiguities such as prepositional phrase attachment. Moreover, the syntactic analysis does not try to identify grammatical functions (direct object, indirect object) or thematic roles (agent, experiencer) of each constituent. In an embodiment of the present invention, the format of the analysis representation is that of an adapted feature structure representation. The order of the constituents is represented by the order of the arcs that appear in the feature structure.

The level of shallow syntactic analysis performed by an embodiment of the present invention is very robust and general as it does not depend on particular domains or situations. The shallow syntactic analysis performed in an embodiment of the present invention is performed both on the example data and on the input string. In this way, a clear separation between domain independent general linguistic knowledge and domain dependent knowledge can be achieved. Consequently, a change of domain only affects the lexicon and example database, but the embodiment is not so limited.

The syntactic analyzer of an embodiment of the present invention is implemented in a parser having a mechanism to manipulate feature structure representations. For efficient implementation, as described herein, an embodiment of the present invention uses a GLR parser with feature structure operators. Furthermore, the shallow syntactic analyzer can also be integrated with a statistical processing component which may help resolve lexical ambiguities and other local ambiguities to reduce the burden of the example-data processing, but the embodiment is not so limited.

Natural human speech is not perfectly complete and grammatical as it often includes repeated words, omissions, and incomplete sentences. For these reasons, the translation method of an accurate spoken language translation system needs to be more flexible and robust, wherein the translation component is able to handle input that has incorrectly added or deleted or substituted words. To provide flexibility and robustness, a typical speech translation system uses many different types of translation knowledge, thereby resulting in an example specificity problem of how an example-based system can use examples with different grades of linguistic specificity. An embodiment of the present invention uses a hybrid rule-based/analogical approach to speech translation that provides a solution to this problem.

Figure 7:
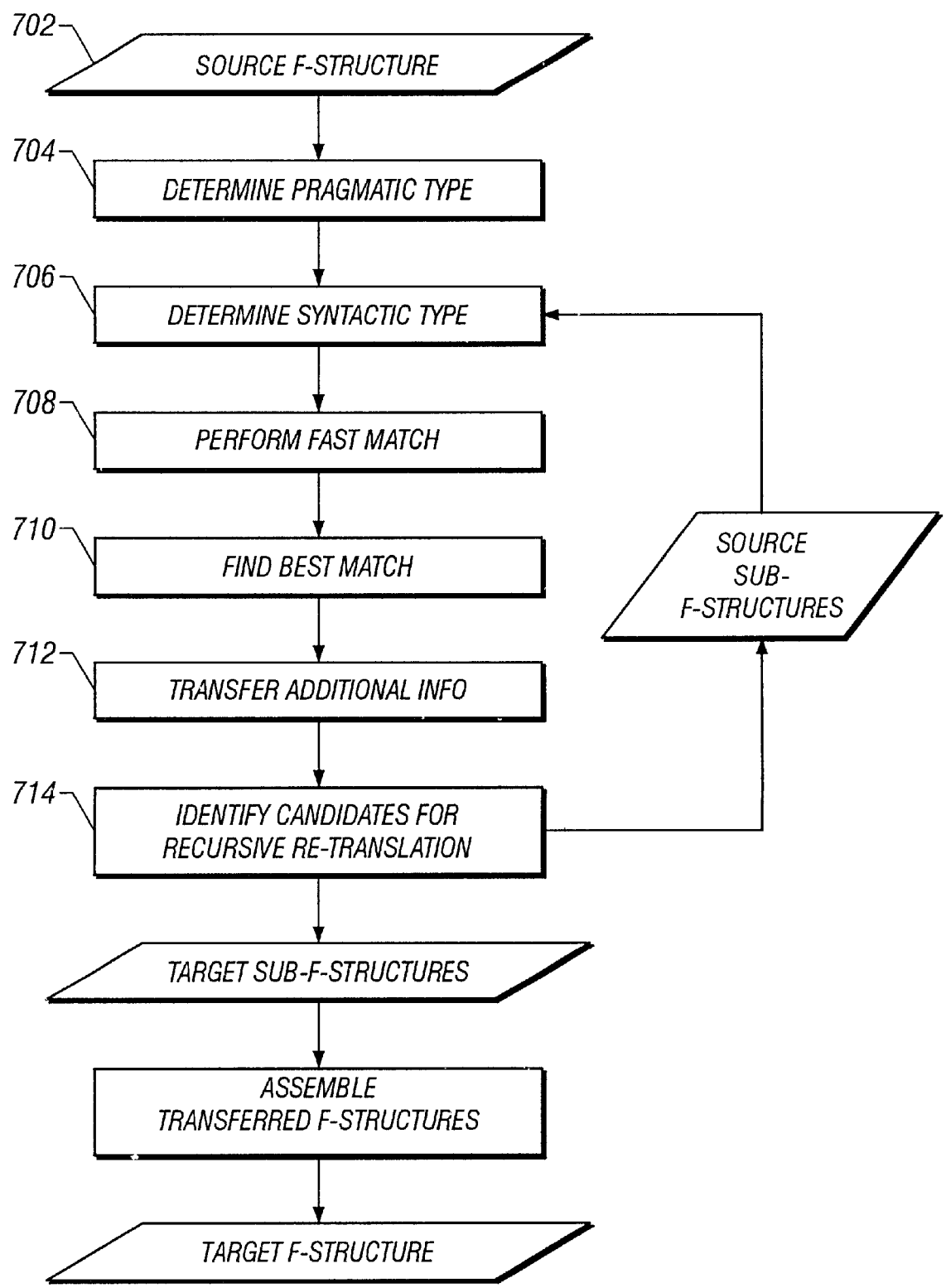
FIG. 7 is a matching and transfer algorithm of a translation component of an embodiment of the present invention.

The hybrid rule-based/analogical approach of the present invention comprises methods for example combination, fast match, and best match. FIG. 7 is a matching and transfer algorithm of a translation component of an embodiment of the present invention. The translation component receives a source feature structure 702 and performs a detailed syntactic analysis on an example database and on the input string. This creates shallow syntactic representations, which comprise, among other linguistic information, the pragmatic type 704 and the sentence type 706 of the expression or sentence.

A matching and transfer is then performed, wherein an initial fast match 708 is performed that quickly checks compatibility of the input and the example database. This initial fast match 708 eliminates the necessity of carrying out a time and space consuming detailed match for every example in the example database. A detailed or best match 710 is performed as an optimization procedure over operations to insert, delete or join (match up) 712 parts of the syntactic representation. This provides a flexible way to match that does not require all parts of the structure to be accounted for since insertions and deletions are possible. Using this approach, multiple examples may be identified and combined 714 to match an input because the matching and transfer procedure works recursively over parts of the shallow syntactic input structure. The method described herein for matching and transfer is general in the sense that it does not depend on examples of any particular degree of linguistic specificity; it works with very general examples as well as with very specific examples that include a great deal of context on which the translation depends.

Automatic translation by analogy of an embodiment of the present invention comprises the use of bilingual pairs of examples to represent what has been described as translation knowledge, the information about how equivalent meanings are expressed in the source and target languages. This approach is inherently robust, making it well-suited to spoken language, which often exhibits extra-grammatical phenomena. In addition, translation accuracy is improved in the present invention by adding examples with more specific context, provided that the example specificity problem can be solved. The most challenging problem in example-based translation, however, relates to the need to combine examples of different grades of linguistic specificity. In applying example pairs of increasing linguistic specificity, an embodiment of the present invention uses example pairs comprising co-indexed, shallow syntactic representations that are able to capture information at any level of linguistic specificity. Consequently, the present invention solves the example specificity problem by dividing it into three sub-problems: best match; fast match; and, example combination.

The best match sub-problem involves finding the best match from the example database given an input. An embodiment of the present invention uses a matching procedure based on operators for inserting, deleting, or matching parts of the shallow syntactic representation of the input comprising a tree with nodes and arcs. This matching procedure is implemented using a dynamic programming algorithm that minimizes the overall match cost, which is defined in a recursive manner over arcs in the trees.

The three possible actions (insert, delete, join) incur costs that depend on the labels of the arcs, the costs for the node values of the arcs, and costs based on feature-values and thesaurus-based semantic similarity for words. For an input node I with arcs $<i_1, i_2, \ldots, i_m>$ and an example node E with arcs $<e_1, e_2, \ldots, e_n>$, the match Cost C(I,E) is defined by the following recurrence:

$$C(\langle i_1, i_2, \ldots, i_m \rangle; \langle e_1, e_2, \ldots, e_n \rangle) =$$
$$\min \begin{cases} C(i_2, \ldots, i_m; e_1, e_2, \ldots, e_n) + add - \cos t(i_1) \\ C(i_1, i_2, \ldots; i_m, e_2, \ldots, e_n) + delete - \cos t(e_1) \\ C(i_2, \ldots, i_m; e_2, \ldots, e_n) + join - \cos t(i_1, e_1) \end{cases}$$

In a typical domain, the required example database grows to a considerable size. For example, in an embodiment of the present invention, the database comprises approximately 10,000 example pairs. Thus, it is not possible to carry out detailed matching of the input to every example, and the search space for the best match problem must be constrained in some way.

The search space is constrained in an embodiment of the present invention by performing an initial fast match that rules out unlikely examples, but the embodiment is not so limited. The shallow syntactic analysis module identifies the syntactic type and the pragmatic type of the input, and matching is constrained according to these types. In addition, a fast match is performed based on the syntactic head of the constituents to be matched; this can be constrained to equality, or to a thesaurus-based measure of close semantic similarity.

In order to translate a wide variety of inputs, an embodiment of the present invention combines a number of examples (or parts of examples) in the transfer process, by performing matching and transfer recursively on parts of the shallow syntactic representation of the input. At each recursive step, after detailed matching has been performed, additional information in the input that is not covered by the example is handled, as well as redundant information from the example, but the embodiment is not so limited.

The present invention comprises a method for constructing one or more hypotheses for speech recognition in a speech translation system, presenting the hypothesis or hypotheses to the user along with optional translations, having the user select the best hypothesis, and then using the selection from the user to perform adaptation of the hypothesis construction component. Using this method, the system learns the types of things that the user says and improves system performance of the hypothesis construction component. The effect is that the correct hypothesis will be presented to the user as the most likely hypothesis more and more often as the user uses the device.

Figure 8:
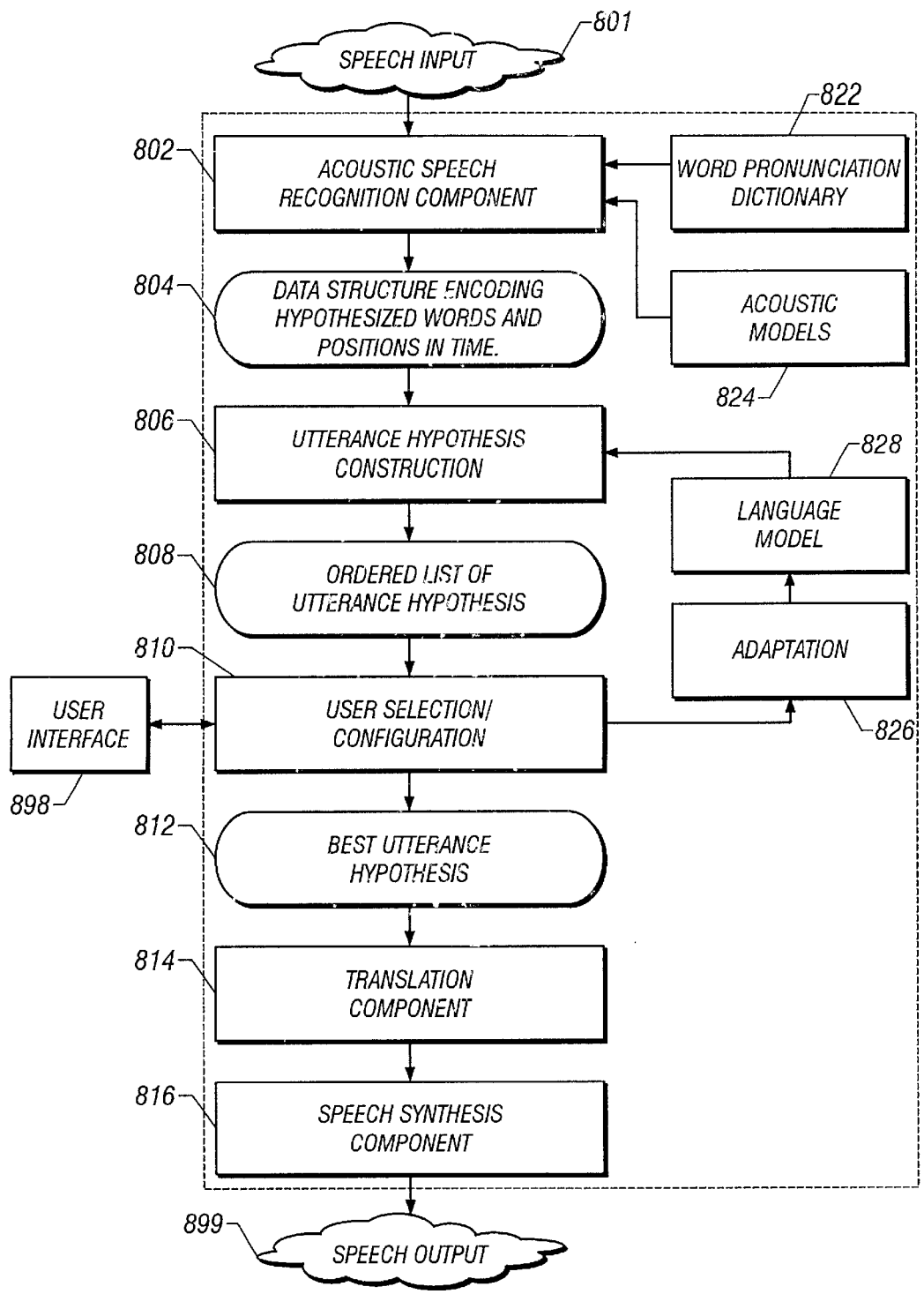
FIG. 8 shows the hypothesis selection components of a speech translation system of an embodiment of the present invention.

FIG. 8 shows the hypothesis selection components of a speech translation system of an embodiment of the present invention. Operation begins with the receipt of a speech input 801 at the acoustic speech recognition component 802. The acoustic speech recognition component 802 accesses and uses at least one word pronunciation dictionary 822 and at least one acoustic model 824 to generate at least one data structure 804 encoding hypothesized words and their corresponding positions and time. The data structure information 804 is used for utterance hypothesis construction 806, wherein an ordered list of utterance hypotheses 808 are produced. User selection- configuration 810 then takes place, wherein a user selects the best utterance hypothesis 810. User selection-configuration is accomplished through a user interface 898. The user selection is used as an adaptation input 826 to the speech translation system language models 828. The best utterance hypothesis 812 is used as an input to the translation component 814 and the speech synthesis component 816 of the speech translation system, which produce a translated speech output 899.

A problem faced by a speech translator is that the speech input has many degrees of variability as a result of user accents, different user pronunciations, input speech at different volumes, different positions of the microphone during speech, and different types and levels of background noise. For these reasons, the speech recognition component does not attempt to identify only the exact utterance made by the user. When the speech input is garbled or ungrammatical, identification of the exact utterance may not be possible. Prior systems that operate by attempting to identify exact utterances may produce no output or an incorrect output when it is not possible to perform an identification. In this case, the user may be unsure why the input was not operated on by the system. The present invention overcomes these problems. The speech recognition component of an embodiment identifies a number of possibilities, and the user may choose from these possibilities, or speech recognition hypotheses, the correct or best hypothesis.

The speech recognition and hypothesis/hypotheses construction steps are carried out separately, but the embodiment is not so limited. In the first stage, the speech recognizes user acoustic information to propose hypotheses for words in the speech signal. In the second step, the hypothesis construction component takes this information, and constructs an ordered list of entire utterances that are recognition hypotheses for the entire speech input. As an intermediate step, the STS of an embodiment may also construct a word graph, but is not so limited.

The utterance hypothesis construction component of an embodiment uses information about language to construct utterance hypotheses. This information is called a language model because it is a mathematical model that is used to assign probabilities to utterances. These utterance probabilities are derived from probabilities of parts of the utterance, of certain segments, or of other derived features or characteristics. For example, a standard language model used inspeech recognition uses so-called n-gram probabilities, such as unigram probabilities of words occurring P(Word), bigram probabilities of a word occurring given that the previous word has occurred $P(word_i/word_{i-1})$, and trigram probabilities of a word occurring given that the previous two words have occurred $P(word_i/words_{i-2}, word_{i-1})$. The overall probability of an utterance is then calculated from these basic probabilities.

Another approach to creating a language model is to use other types of basic probabilities. For example, syntactic analysis may be performed, and the basic probabilities may make reference to the probabilities of certain grammar rules used in the analysis. Or, the basic probabilities could make reference to grammatical functions such as "subject", "verb", object", so that a basic probability is formulated in the form $P(verb=word_i/subject=word_j, object=word_k)$. The confirmation/selection action performed by the user to carry out adaptation of the language model may be used regardless of the type of basic probability used. The effect of this will be that the hypothesis construction component adapts to the utterances that the user makes, and learns to favor utterances that the user is more likely to make. Then, these utterances will appear higher and higher on the ordered list of utterance hypotheses, and the speech translator becomes relatively easier to use.

Figure 9:
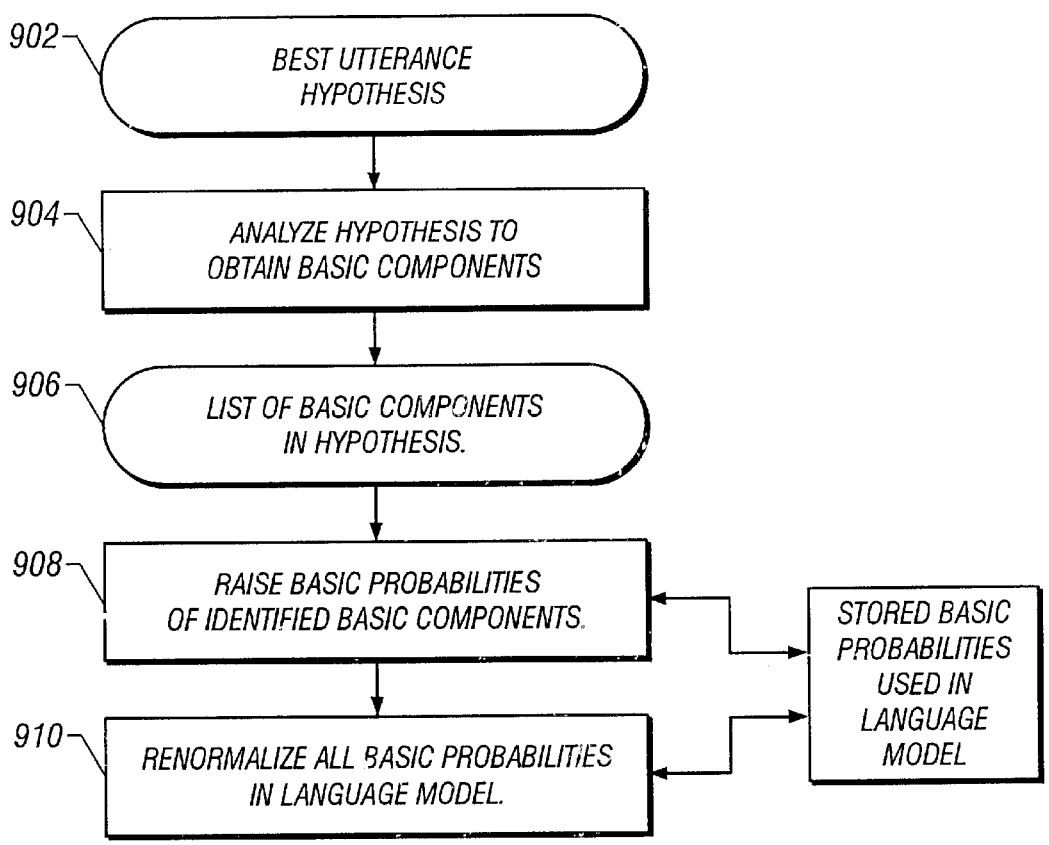
FIG. 9 is a flowchart for language model adaptation of a speech translation system of an embodiment of the present invention.

FIG. 9 is a flowchart for language model adaptation of a speech translation system of an embodiment of the present invention. The fundamental idea for carrying out the adaptation is to take the correct or best utterance hypothesis 902 that was selected by the user, and to analyze 904 it according to the language model. For example, if it is an n-gram language model, then the analysis would consist of identifying the individual words and word bigrams and trigrams in the hypothesis. A list of basic components in the hypotheses is generated 906, and credit is assigned to these basic units by raising the probabilities for the basic units 908. Then, all the basic probabilities in the language model are re-normalized 910 which has the effect of slightly lowering all other basic probabilities.

Although English morphology is a relatively well-understood phenomenon, the computational treatment of morphological problems and the integration of a morphological analyzer with other components of a speech translation system should take into account the intended application and overall efficiency. Morphological analysis is the process of analyzing words into morphemes, identifying root forms and grammatical categories, and detecting lexical ambiguity and out-of-vocabulary words. The output of the analysis can be used as input to a parser and other natural language processing modules. The STS of an embodiment of the present invention comprises an Analyzer for Inflectional Morphology (AIM). The AIM of an embodiment of the present invention provides computational efficiency, ease of maintenance of dictionaries, accurate performance for the intended application, and ease of integration with other tools and components.

The AIM of an embodiment identifies the word root and reduces the remaining morphemes of the input word to features. There are two types of morphology: inflectional and derivational. Inflectional morphology deals with morphemes that function as grammatical markers, such as the plural marker -s-, or the past-tense marker -ed in English. Derivational morphology deals with prefixes or suffixes that alter the stem's syntactic category or semantic content, such as un- and -ment in the word unemployment. As the AIM of an embodiment handles inflectional morphology, the number of entries in the computational dictionary of the STS as well as the number of entries in the translation knowledge base of the STS are reduced because different inflections do not typically influence the translational context.

While typical two-level morphological analyzers apply an array of morphological rules in parallel, the AIM of an embodiment uses a sequential approach that overcomes the disadvantages of two-level morphology, notably slow processing speed, notational complexity, and the problem that correct analysis is possible only if all finite-state transducers make their way to the end. The AIM receives a string of words as an input and returns the analysis of each word in the form of a lexical feature structure, a linguistic data structure that contains feature-value pairs for strings, symbols, and numbers. As it analyzes each word, the AIM consults the dictionary, whose entries also resemble lexical feature structures, but is not so limited. Once the morphological analyzer identifies the root and the inflection of the input word, it takes the formation from the dictionary, and inserts appropriate feature-value pairs for inflection into the output feature structure. This output format allows the AIM of an embodiment to be integrated with a syntactic parser that operates on feature structures, while also providing other STS components quick access to relevant features (e.g. the ROOT of each word).

Figure 10:
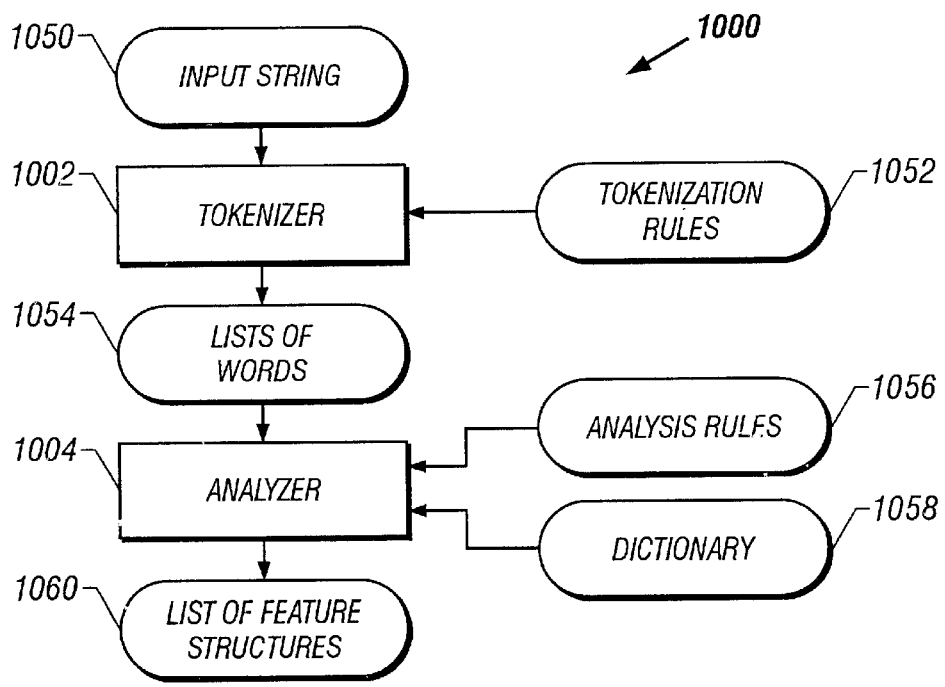
FIG. 10 is an Analyzer for Inflectional Morphology (AIM) of an embodiment of the present invention.

FIG. 10 is an Analyzer for Inflectional Morphology (AIM) 1000 of an embodiment of the present invention. The AIM 1000 comprises two main modules, a tokenizer 1002 and a morphological analyzer 1004, but is not so limited.

The tokenizer 1002 of an embodiment takes an input string 1050 comprising a sequence of words and breaks it into individual tokens 1054 comprising full words, reduced words, numbers, symbols, punctuation characters, but is not so limited. This process examines the local context, or the current character and its immediate neighbors, and uses a small set of tokenization rules 1052. In an embodiment, the tokenizer makes a break at the following places with the corresponding effect, but is not so limited:

space character (space, return, tab, End-of-Sentence (EOS));
apostrophe+space character ("Doris'"→"Doris" "'");
apostrophe+"s" ("Peter's"→"Peter" "'s");
apostrophe+"re" ("they're"→"they" 37 're");
apostrophe+"d" ("Peter'd"→"Peter" "'d");
apostrophe+"ve" ("Peter've"→"Peter" "'ve");
apostrophe+"ll" ("Peter'll"→"Peter" "'ll");
period+EOS ("Peter likes fish."→"Peter" "likes" "fish" ".");
question mark ("Does Peter like fish?"→"does" "Peter" "like" "fish" "?");
exclamation mark ("Fish!"→"fish" "!");
comma (except between numbers) ("apples, oranges and bananas"→"apples" "," "oranges" "and" "bananas");
dollar sign ("$30"→"$" "30");
percent sign ("30%"→"30" "%");
plus sign ("+80"→"+" "80");
minus sign (only when followed by a number) ("-3"→"-" "3");
semicolon ("fruits; apples, oranges and bananas"→"fruits" ";" "apples" "," "oranges" "and" "bananas");
colon (except between numbers).

The analyzer 1004 of an embodiment takes the output 1054 from the tokenizer 1002, a sequence of tokens, and analyzes each word by consulting the dictionary 1058 and a set of analysis rules 1056. The dictionaries 1058 comprise lexicons in the format of feature structures. An appropriate feature structure 1060 is constructed for the word, inserting features associated with the inflection type in question. If the token can be analyzed, the feature structure of the token with newly generated morphological features is output. If the analyzer 1004 finds more than one valid analysis of the word, it returns a multiple feature structure; if the analyzer 1004 is unable to find an analysis, it returns a special feature structure for an unknown word. Furthermore, possible splits of the sequence of tokens are determined, and a determination is made as to whether each split is valid. Morphological rules are applied to rule out unwanted splits and to assign proper morphological information to corresponding features.

The dictionary format of an AIM of an embodiment of the present invention provides three different types of entries wherein a minimum to a large amount of information may be encoded. Each entry of a dictionary is a lexical feature structure, wherein the data structure of a dictionary is an array with elements comprising a key and a lexical feature structure. The treatment of irregular forms as separate entries in the AIM does not impose much additional burden in terms of the number of entries and complexity, but aids organization and increases usability and ease of maintenance. The sorting of all entries by root feature makes the dictionary easier to organize and maintain and maximizes usability for the purposes of morphological analysis. Furthermore, the AIM dictionary structure makes it easy to add new features to the dictionary entries.

Moreover, the dictionary format may be reused for design implementation and usage of a morphological generator.

The features and advantages of an embodiment of the present invention comprise modularity, handling of inflectional morphology, sequential rule application, an output format comprising feature structures with feature value pairs, an improved dictionary format, improved processing speed, reduced memory requirement, and increased overall performance. Regarding modularity, as the AIM is a modular part of the translation system, it can easily be used and integrated into other applications and tools (e.g. for word extraction from large corpora). Regarding the handling of inflectional morphology, an embodiment of the present invention comprises a reduced number of dictionary entries and a reduction in the number of entries in the translation knowledge base. The AIM of an embodiment of the present invention is easy to maintain since the direct correspondence between the transfer knowledge base and the dictionary is preserved. The sequential rule application provides for advantages in that the morphological analysis is faster, less computationally complex, always returns an analysis, provides reliable and accurate performance, and provides for ease of maintenance of rule sets. The output format of the AIM of an embodiment of the present invention makes it easy to integrate the AIM with a syntactic parser which also operates on feature structures. Furthermore, it provides for quick access to relevant individual features (e.g. root, grammatical category).

As discussed herein, an embodiment of the present invention comprises a powerful parser for natural language. A parser is a software module that takes as input a sentence of a language and returns a structural analysis, typically in the form of a syntax tree. Many applications in natural language processing, machine translation, and information retrieval require a parser as a fundamental component. The parser of an embodiment of the present invention is used for speech-to-speech translation and integrates feature structure manipulations into a GLR parsing algorithm by introducing a flexible representation and a safe ambiguity packing mechanism. The feature structure unifications are invoked when a new parse node is created. A sentential feature structure is associated with the root node of packed forest. The feature structure constraints of an embodiment are performed when a reduce operation is executed, but the embodiment is not so limited. The parser of an embodiment has advantages over typical parsers, in that it provides for flexible feature structure representation and complete manipulation. Furthermore, the parser provides for safe local ambiguity packing with feature structures in a parse forest.

Figure 11:
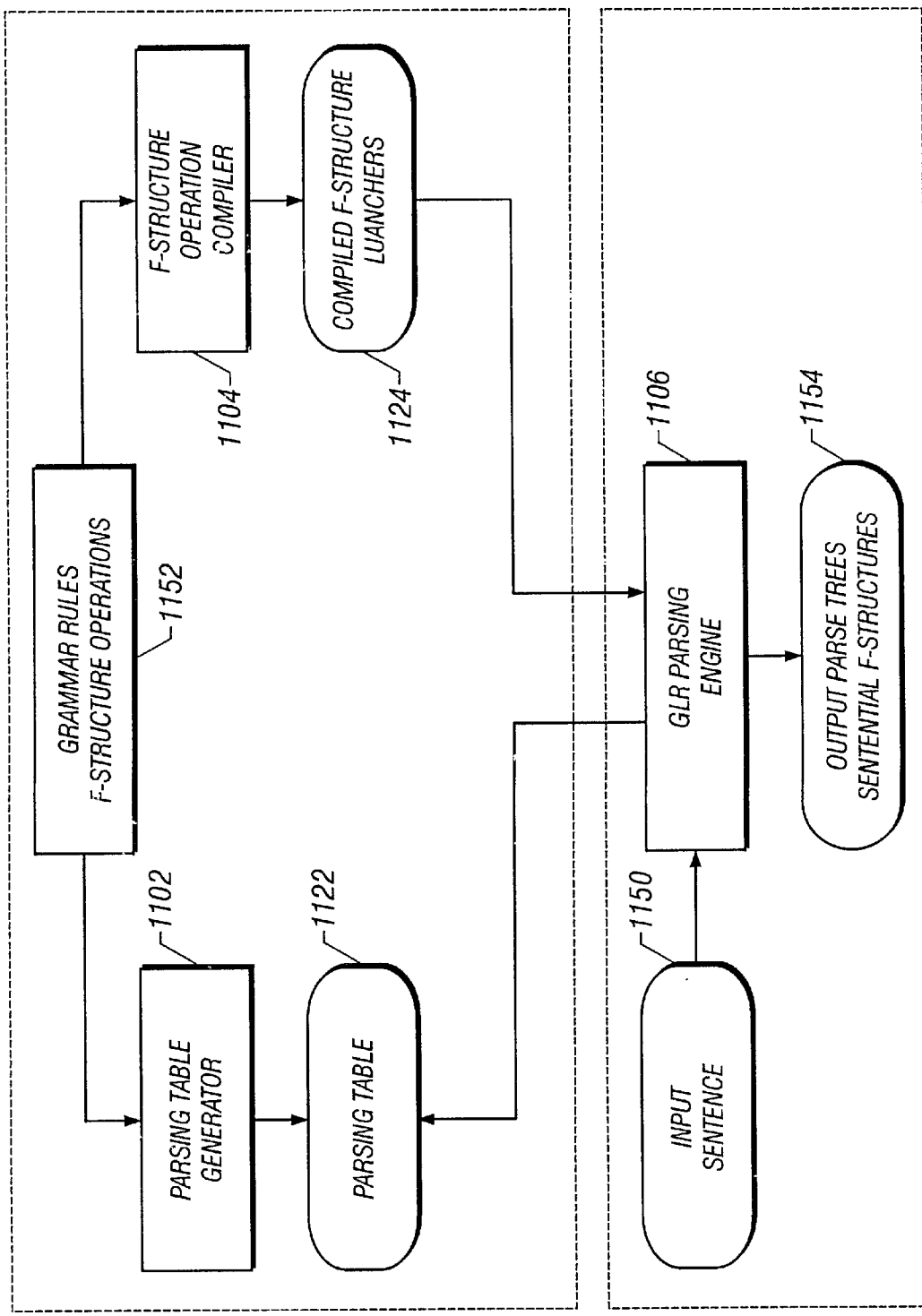
FIG. 11 is a parser implementation of an embodiment of the present invention.

FIG. 11 is a parser implementation of an embodiment of the present invention. The parser comprises an parsing table generator 1102, a feature structure (F-structure) operation compiler 1104, and a GLR parsing engine 1106 with feature structure constraint application. The parsing table generator 1102 receives an input comprising a set of grammar rules bundled with or annotated with feature structure manipulations or operations 1152. The grammar rules of an embodiment comprise English parsing grammar rules and Japanese parsing grammar rules, and the grammar rules may comprise context-free grammar rules, but are not so limited. The parsing table generator takes the grammar rules and creates a data structure that encodes the operations of the parser. The data structure controls the parser in the performance of a set of operations, wherein the set of operations comprises a reduce action, a shift action, an accept action, and a fail action, but is not so limited. The parsing table generator 1102 provides an output comprising a parsing table 1122 that is stored as a file in an embodiment.

The feature structure operation compiler 1104 receives an input comprising a set of grammar rules bundled with feature structure manipulations or operations 1152. The feature structure operation compiler 1104 takes the feature structure operations or annotations comprising high-level instructions in a programming language and compiles them into other functions in a programming language source code. The feature structure operation compiler 1104 provides an output comprising C language source code for the compiled feature structure functions 1124, but is not so limited. The feature structure functions 1124 are compiled and linked with the GLR parsing engine 1106. The GLR parsing engine 1106 also consults the parsing table 1122. The parsing engine 1106 operates on the input sentences 1150 to provide an output 1154 comprising parse trees and sentential feature structures. The integration of feature structures and the parsing engine follows the augmented GLR algorithm of an embodiment of the present invention.

The feature structure operation compiler 1104 of an embodiment converts feature structure grammar into a C program which is compiled again by a C compiler and linked to the modules of the GLR parsing engine 1106. It takes an input comprising a set of grammar rules bundled with feature structure manipulations or operations 1152. It converts the feature structure manipulations or operations to instructions in a programming language, such as a C program. Formal variables are replaced by expressions that represent references to the appropriate memory locations at parser run-time.

Figure 12:
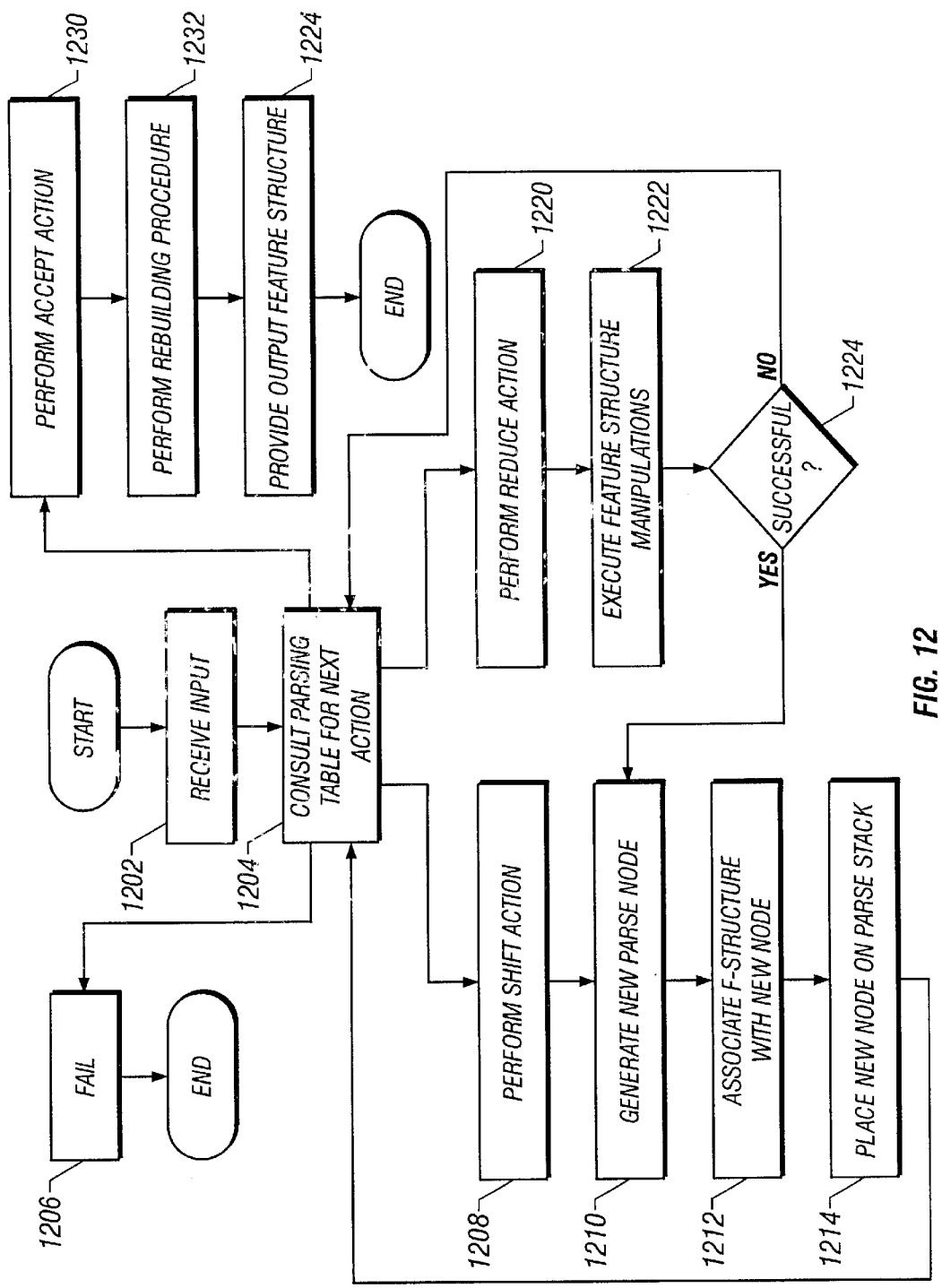
FIG. 12 is a flowchart for a method of parsing in a spoken language translation system of an embodiment of the present invention.

FIG. 12 is a flowchart for a method of parsing in a spoken language translation system of an embodiment of the present invention. Operation begins at step 1202, at which at least one input is received comprising at least one input sentence or expression. At step 1204, the parsing table is accessed and consulted for a next action, wherein the parser looks up in the next action in the parsing table, but is not so limited. If the parser is unable to analyze the input, the next action is a fail action and operation continues at step 1206, at which the analysis stops. During parsing operations, the parser may perform shift actions and reduce actions, but is not so limited.

If the next action is determined to be a shift action at step 1204, operation continues at step 1208, at which a shift action is performed. The shift action shifts onto a stack or intermediate data structure of the parser the next item of the input string. The stack or intermediate data structure of an embodiment comprises at least one graph-structured stack that is maintained. The stack comprises at least one parsing state, and at least one representation of each input word is shifted onto the at least one graph-structured stack. A new parse node is generated, at step 1210. A feature structure or lexical feature structure of the shifted input item is obtained from the morphological analyzer and associated with the new parse node, at step 1212. At step 1214, the new node is placed on the stack or intermediate data structure, and operation continues at step 1204, at which the parsing table is consulted for a next action.

If the next action is determined to be a reduce action at step 1204, operation continues at step 1220, at which a reduce action is performed. The reduce action corresponds to the application of at least one grammar rule from the set of grammar rules, so that the reduce action comprises accessing and applying the compiled feature structure manipulations or functions that are associated with the applied grammar rule, but the embodiment is not so limited. At step 1222, the feature structure manipulations are executed. A determination is made, at step 1224, whether the manipulations fail or succeed. If the manipulations fail then application of the rule fails, and operation continues at step 1204, at which the parsing table is consulted for a next action. If the manipulations succeed, operation continues at step 1210, at which a new parse node is generated comprising the new feature structure s resulting from the successful feature structure manipulations.

When the parser has analyzed the entire input successfully and generated at least one packed shared parse forest, the next action is an accept action, and operation continues at step 1230, at which the accept action is performed. At step 1232, a rebuilding procedure is performed on the context-free tree structure of the input sentence generated by the parser. The output feature structure is provided, at step 1234, wherein the output comprises a structural analysis of the input. The structural analysis of an embodiment comprises a plurality of parse trees and sentential feature structures, but is not so limited.

The parsing of an embodiment of the present invention comprises the performance of safe local ambiguity packing and the recursive rebuilding of the at least one feature structure. The step of recursively rebuilding comprises marking each of the nodes for which the feature structures are to be rebuilt. At least one log is maintained comprising each of the nodes for which the feature structure is to be rebuilt. The farthermost marked node from the root node is located, when traversing at least one branch path of the packed shared parse forest. Once located, the feature structure of the farthermost marked node is rebuilt. The feature structures of each marked node in succession along the branch path between the farthermost marked node and the root node are rebuilt, and the root node feature structures are rebuilt.

Figure 13:
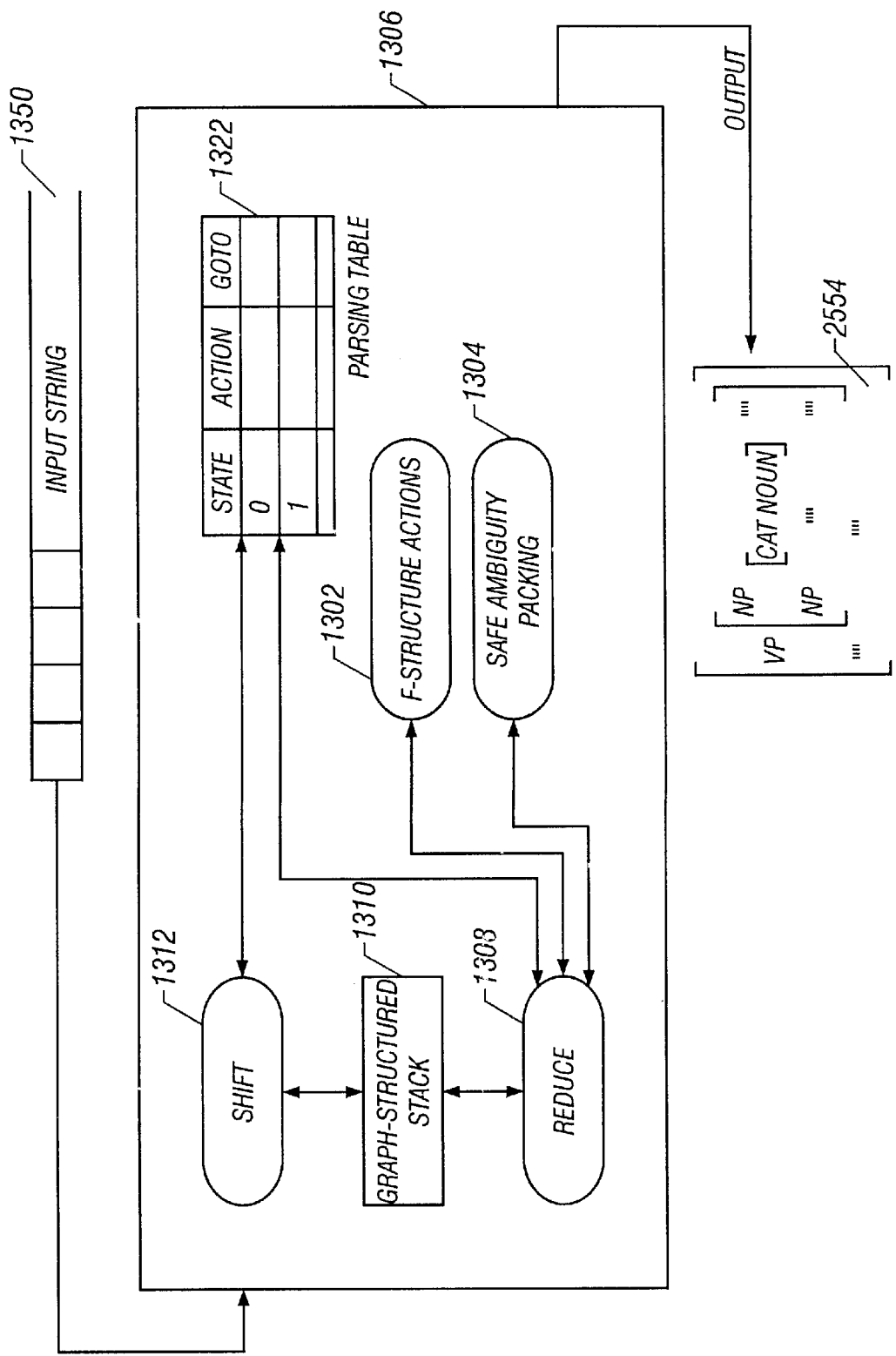
FIG. 13 is a parsing engine of an embodiment of the present invention.

FIG. 13 is a parsing engine 1306 of an embodiment of the present invention. The parsing engine 1306 comprises feature structure actions 1302 and safe ambiguity packing 1304, but is not so limited. Moreover, the parsing engine 1306 comprises a graph-structured stack 1310 as a general device for efficient handling of nondeterminism in the stack. In an embodiment, the data structure of a parse node in the packed forest is augmented to be associated with a feature structure, but is not so limited. The feature structure can be generated either in shift action 1312 or reduce action 1308, but the embodiment is not so limited. When a shift action 1312 is performed, a new parse node is created for the new shifted symbol. The feature structure of this parse node is created by copying the feature structure lexicon. When a reduce action 1308 is performed, the set of feature structure actions associated with the reduce action is performed first. If none of the feature structure actions indicates failure, then a new parse node is created and associated with the resulting feature structure. Otherwise the current reduction fails. If a parse node is a packed node, which means that a local ambiguity packing happened, then a disjunctive feature structure is used to represent the packed ambiguities.

In a typical GLR parser, in which the root node is a packed node and the feature structure of the root node 1354 is the final output of the parsing, local ambiguity packing is used to save storage for parse trees. However, the typical GLR parser has a problem in that, if new ambiguity packing occurs on another packed node, the feature structure of the root node will not typically reflect the changes, so that the final output of the parsing may be incorrect.

The safe ambiguity packing 1304 of an embodiment of the present invention comprises retaining log information during parsing, and rebuilding the feature structure of nodes as needed when parsing is finished, but is not so limited. In retaining log information, the original data structure of a parse node is augmented to incorporate log information that indicates how the feature structure of the parse node has been constructed. Furthermore, an updated node list or link list is maintained during parsing to store the nodes having updated feature structures. The check for updated nodes is performed upon local ambiguity packing. The ancestors of an updated node should be rebuilt to reflect the new changes. Consequently, all nodes that need to be rebuilt in the parse tree are marked. When entering the rebuild stage, the rebuild procedure begins at the root of the parse tree and recursively searches for marked nodes. Marked nodes, when found, are rebuilt. The feature structure of the root node is rebuilt at the end.

An embodiment of the present invention comprises the generation of stylistically different natural language expressions depending on the users needs or preferences. Natural language generation components can be used as a part of natural language interface and spoken/written dialogue systems as well as spoken language translation systems. By providing an option to set the "agent's" style, an embodiment of the present invention allows users to customize or personalize the system and thus increase the attractiveness of the system. The system may also randomly change the output style so that it can have more entertainment aspects.

An embodiment of the present invention combines rule-based natural language generation components with style parameters. Most of style variations are observed in rather small part of the sentence structure comprising conjugations, predicate forms, modals and some lexical selections, and many are, like other linguistic phenomena, systematic. The present invention takes advantage of these characteristics by incorporating style parameters in rule-based generation, This way, many share structures which encode the core meaning of the message are handled uniformly to be space-efficient and time-efficient.

In handling stylistically different natural language expressions, an embodiment of the present invention sends a style parameter to the target language generation component as one of the global parameters. The style parameter can be extracted from the input source language in spoken language translation, set by the user, or randomly selected by the system itself, but the embodiment is not so limited. The parameters are then consulted in the appropriate parts of the rule-base to generate the target expression. This method can best be combined with a similar parameter setting in the speech synthesis program to achieve the maximum effect in the spoken output.

Example style variations that the system may be able to handle include formality (butler-mode and buddy-mode, etc.), local dialects (standard Japanese vs. Osaka dialect, etc.), and gender and age (young female vs. Middle-aged male, etc.), but the embodiment is not so limited. For example, an output in the butler mode may be "would you care to", and a corresponding output in the buddy mode may be "wanna", and a corresponding default mode output may be "do you want to". As a further example, an output in the butler mode may be "would you care to try our new car?", and a corresponding output in the buddy mode may be "wanna try our new car?", and a corresponding default mode output may be "do you want to try our new car?". In another example, an output in the butler mode may be "would you be so kind as to hand me the salt?", and a corresponding output in the buddy mode may be "gimme the salt!", and a corresponding output in the default mode may be "can you hand me the salt?".

Figure 14:
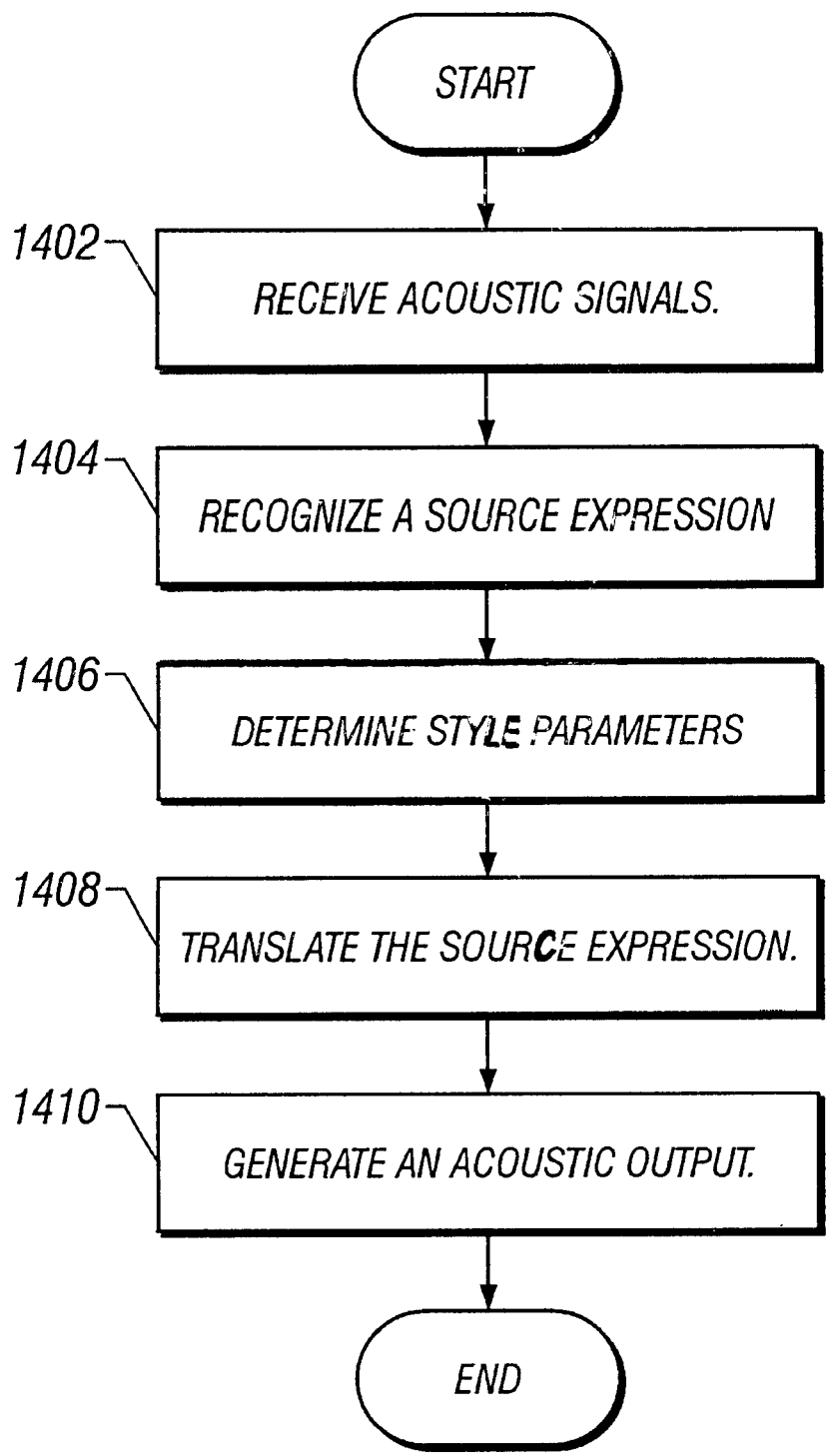
FIG. 14 is a flowchart for a method for providing style control in natural language recognition and generation.

FIG. 14 is a flowchart for a method for providing style control in natural language recognition and generation. An acoustic input is received at step 1402 comprising at least one source language. The acoustic input comprises words, sentences, and phrases in a natural spoken language. Source expressions are recognized in the source language, at step 1404. Style parameters are determined for the source expression, at step 1406. The style parameters may be extracted from the source expression, set by the user, or randomly selected by the natural language system. A recognized source expression is selected and confirmed by a user through a user interface. The recognized source expressions are translated from the source language to a target language, at step 1408. An acoustic output is generated from the translated target language source expressions, at step 1410, using the style parameters. The style parameters comprise variations selected from a group comprising formality, local dialect, gender, and age variations.

Thus, a method and apparatus for a spoken language translation system have been provided. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method for performing style control in language translation, comprising:

receiving acoustic signals comprising at least one source language;

recognizing at least one source expression of the at least one source language;

extracting at least one style parameter from the at least one source expression;

translating the recognized at least one source expression from the at least one source language to at least one target language;

incorporating the at least one style parameter with rule based speech generation to generate at least one acoustic output from the translated at least one target language using the at least one style parameter; and providing the at least one acoustic output.

2. The method of claim 1, wherein generating at least one acoustic output comprises incorporating the at least one style parameter with rule-based speech generation, wherein the at least one style parameter is consulted during rule-based based generation of the at least one acoustic output.

3. The method of claim 1, wherein the at least one style parameter is extracted from at least one part of a sentence structure selected from a group comprising conjugations, predicate forms, modals, and lexical selections.

4. The method of claim 1, further compressing providing the at least one style parameter as a global parameter.

5. The method of claim 1, wherein the at least one style parameter is selected from a group compressing formality, local dialect, gender, and age variations.

6. A method for performing style control in language translation, comprising:

receiving acoustic signals comprising at least one source language;

recognizing at least one source expression of the at least one source language;

determining at least one style parameter of the at least one source expression by randomly selecting the at least one style parameter;

translating the recognized at least one source expression from the at least one source language to at least one target language;

generating at least one acoustic output from the translated at least one target language using the at least one style parameter; and providing the at least one acoustic output.

7. An apparatus for spoken language translation comprising:

at least one processor;

an input coupled to the at least one processor, the input capable of receiving acoustic signals comprising at least one source language, the at least one processor configured to translate the received acoustic signals by, recognizing at least one source expression of the at least one source language;

extracting at least one style parameter from the at least one source expression;

translating the recognized at least one source expression from the at least one source language to at least one target language;

incorporating the at least one style parameter with rule based speech generation to generate at least one acoustic output from the translated at least one target language using the at least one style parameter; and an output coupled to the at least one processor, the output capable of providing the at least one acoustic output.

8. The apparatus of claim 7, wherein generating at least one acoustic output comprises incorporating the at least one style parameter with rule-based speech generation, wherein the at least one style parameter is consulted during rule-based generation of the at least one acoustic output.

9. An apparatus for spoken language translation comprising:

at least one processor;

an input coupled to the at least one processor, the input capable of receiving acoustic signals comprising at least one source language, the at least one processor configured to translate the received acoustic signals by, recognizing at least one source expression of the at least one source language;

determining at least one style parameter of the at least one source expression by randomly selecting the at least one style parameter;

translating the recognized at least one source expression from the at least one source language to at least one target language;

generating at least one acoustic output from the translated at least one target language using the at least one style parameter; and an output coupled to the at least one processor, the output capable of providing the at least one acoustic output.

10. The apparatus of claim 9, wherein the at least one processor is further configured to translate the received acoustic signals by providing the at least one style parameter as a global parameter.

11. The apparatus of claim 9, wherein the at least one style parameter is selected from a group comprising formality, local dialect, gender, and age variations.

12. A computer readable medium containing executable instructions which, when executed in a processing system, causes the system to perform a method for spoken language translation, the method comprising:

receiving acoustic signals comprising at least one source language;

recognizing at least one source expression of the at least one source language;

extracting at least one style parameter from the at least one source expression;

translating the recognized at least one source expression from the at least one source language to at least one target language;

incorporating the at least one style parameter with rule based speech generation to generate at least one acoustic output from the translated at least one target language using the at least one style parameter; and providing the at least one acoustic output.

13. The computer readable medium of claim 12, wherein generating at least one acoustic output comprises incorporating the at least one style parameter with rule-based speech generation, wherein the at least one style parameter is consulted during rule-based generation of the at least one acoustic output.

14. The computer readable medium of claim 12, wherein the at least one style parameter is extracted from at least one part of a sentence structure selected from a group comprising conjugations, predicate forms, modals, and lexical selections.

15. A computer readable medium containing executable instructions which, when executed in a processing system, causes the system to perform a method for spoken language translation, the method comprising:

receiving acoustic signals comprising at least one source language;

recognizing at least one source expression of the at least one source language;

determining at least one style parameter of the at least one source expression by randomly selecting the at least one style parameter;

translating the recognized at least one source expression from the at least one source language to at least one target language;

generating at least one acoustic output from the translated at least one target language using the at least one style parameter; and providing the at least one acoustic output.

16. The computer readable medium of claim 15, wherein the method further comprises providing the at least one style parameter as a global parameter.

17. The computer readable medium of claim 15, wherein the at least one style parameter is selected from a group comprising formality, local dialect, gender, and age variations.

18. A language translation system, comprising:

a means for receiving acoustic signals comprising at least one source language;

a means for recognizing at least one source expression of the at least one source language;

a means for extracting at least one style parameter from the at least one source expression;

a means for translating the recognized at least one source expression from the at least one source language to at least one target language;

a means for generating at least one acoustic output from the translated at least one target language using the at least one style parameter; and a means for providing the at least one acoustic output.

19. The system of claim 18, wherein the means for generating at least one acoustic output comprises a means for incorporating the at least one style parameter with rule-based speech generation, wherein the at least one style parameter is consulted during rule-based generation of the at least one acoustic output.

20. The system of claim 18, wherein the means for determining at least one style parameter comprises a means for extracting the at least one style parameter from the at least one source expression, wherein the at least one style parameter is extracted from at least one part of a sentence structure selected from a group comprising conjugations, predicate forms, modals, and lexical selections.

21. A language translation system, comprising:

a means for receiving acoustic signals comprising at least one source language;

a means for recognizing at least one source expression of the at least one source language;

a means for determining at least one style parameter of the at least one source expression by randomly selecting the at least one style parameter;

a means for translating the recognized at least one source expression fro one source language to at least one target language;

a means for generating at least one acoustic output from the translated at least one target language using the at least one style parameter; and a means for providing the at least one acoustic output.

* * * * *